United States Patent
Bertagnolli et al.

(10) Patent No.: US 9,643,373 B1
(45) Date of Patent: May 9, 2017

(54) PROXIMITY HEATING CELL ASSEMBLY FOR USE IN A HIGH-PRESSURE CUBIC PRESS

(71) Applicant: US Synthetic, Orem, UT (US)

(72) Inventors: Kenneth E Bertagnolli, Riverton, UT (US); Michael A Vail, Genola, UT (US); Arnold D Cooper, Mapleton, UT (US); Paul Douglas Jones, Elk Ridge, UT (US); Damon B Crocket, Mapleton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 637 days.

(21) Appl. No.: 13/736,403

(22) Filed: Jan. 8, 2013

(51) Int. Cl.
   B30B 15/34 (2006.01)
   B30B 11/00 (2006.01)

(52) U.S. Cl.
   CPC ............ B30B 15/34 (2013.01); B30B 11/004 (2013.01)

(58) Field of Classification Search
   CPC .............................. B30B 15/34; B30B 11/004
   USPC ............. 425/77, 330, 352–353; 117/79, 929; 423/446
   See application file for complete search history.

(56) References Cited

U.S. PATENT DOCUMENTS

| | | | | |
|---|---|---|---|---|
| 3,829,544 A * | 8/1974 | Hall | ......................... | B01J 3/062 264/125 |
| 6,124,573 A * | 9/2000 | Hall | ......................... | B30B 15/34 219/407 |
| 6,338,754 B1 | 1/2002 | Cannon et al. | | |
| 7,306,441 B2 * | 12/2007 | Sung | ............................... | 425/77 |
| 7,845,438 B1 | 12/2010 | Vail et al. | | |
| 8,074,566 B1 * | 12/2011 | Bach | ........................ | B01J 3/062 100/102 |
| 8,236,074 B1 | 8/2012 | Bertagnoli et al. | | |
| 8,371,212 B1 * | 2/2013 | Bach | ........................ | B01J 3/062 100/102 |

OTHER PUBLICATIONS

U.S. Appl. No. 12/185,457, filed Aug. 4, 2008, Vail et al.
U.S. Appl. No. 12/495,986, filed Jul. 1, 2009, Bertagnolli et al.
U.S. Appl. No. 13/070,636, filed Mar. 24, 2011, Qian et al.
U.S. Appl. No. 13/552,052, filed Jul. 18, 2012, Qian et al.

* cited by examiner

Primary Examiner — Joseph S Del Sole
Assistant Examiner — Thukhanh T Nguyen
(74) Attorney, Agent, or Firm — Dorsey & Whitney LLP

(57) ABSTRACT

In an embodiment, a cell assembly for use in a high-pressure cubic press may include at least one can assembly containing a diamond volume. The at least one can assembly may include an end surface in proximity to the diamond volume. The cell assembly may include at least one heating element including a major surface generally opposing and positioned adjacent to the end surface of the at least one can assembly. The at least one heating element may be positioned and configured to heat the diamond volume. The cell assembly may include at least one pressure transmitting medium extending about the at least one can assembly, and a gasket medium that defines a receiving space configured to receive the at least one can assembly, the one or more heating elements, and the at least one pressure transmitting medium.

20 Claims, 16 Drawing Sheets

PROXIMITY HEATING CELL ASSEMBLY FOR USE IN A HIGH-PRESSURE CUBIC PRESS

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive polycrystalline diamond layer commonly known as a polycrystalline diamond table. The polycrystalline diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a layer of diamond particles adjacent to a surface of a cemented-carbide substrate and into a can assembly. The can assembly including the cemented-carbide substrate and layer of diamond particles therein may be surrounded by various different pressure transmitting media (e.g., salt liners), positioned in a graphite tube having graphite end caps disposed at respective ends of the graphite tube that forms a heater assembly, and finally embedded in a cube-shaped gasket medium (e.g., pyrophyllite). In an HPHT process used to form a PDC, anvils of an ultra-high pressure cubic press apply pressure to the cube-shaped gasket medium and the contents therein, while the cemented-carbide substrate and layer of diamond particles are controllably heated to a selected temperature at which sintering of the diamond particles is effected by passing an electrical current through the graphite tube and end caps.

SUMMARY

Embodiments of the invention relate to proximity heating cell assemblies for use in a high-pressure cubic press used for fabricating PDCs and methods of use. In an embodiment, a cell assembly for use in a high-pressure cubic press may include at least one can assembly containing a diamond volume (e.g., a plurality of diamond particles). The at least one can assembly may include an end surface in proximity to the diamond volume. The cell assembly may further include at least one heating element including a major surface generally opposing the end surface of the at least one can assembly. The at least one heating element may be positioned and configured to heat the diamond volume. The cell assembly may further include at least one pressure transmitting medium extending about the at least one can assembly. The cell assembly may further include a gasket medium that defines a receiving space configured to receive the at least one can assembly, the one or more heating elements, and the at least one pressure transmitting medium.

In an embodiment, a method may include disposing at least one can assembly within at least one pressure transmitting medium configured to extend about the at least one can assembly. The at least one can assembly includes an end surface and may hold a diamond volume (e.g., a plurality of diamond particles). The method may also include positioning a heating element adjacent to the end surface of the at least one can assembly. For example, the heating element is positioned and configured to heat a plurality of diamond particles before the substrate when current is passed therethrough. The method may further include enclosing the at least one can assembly, the heating element, and the at least one pressure transmitting medium within a gasket medium to form a cell assembly.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1A:
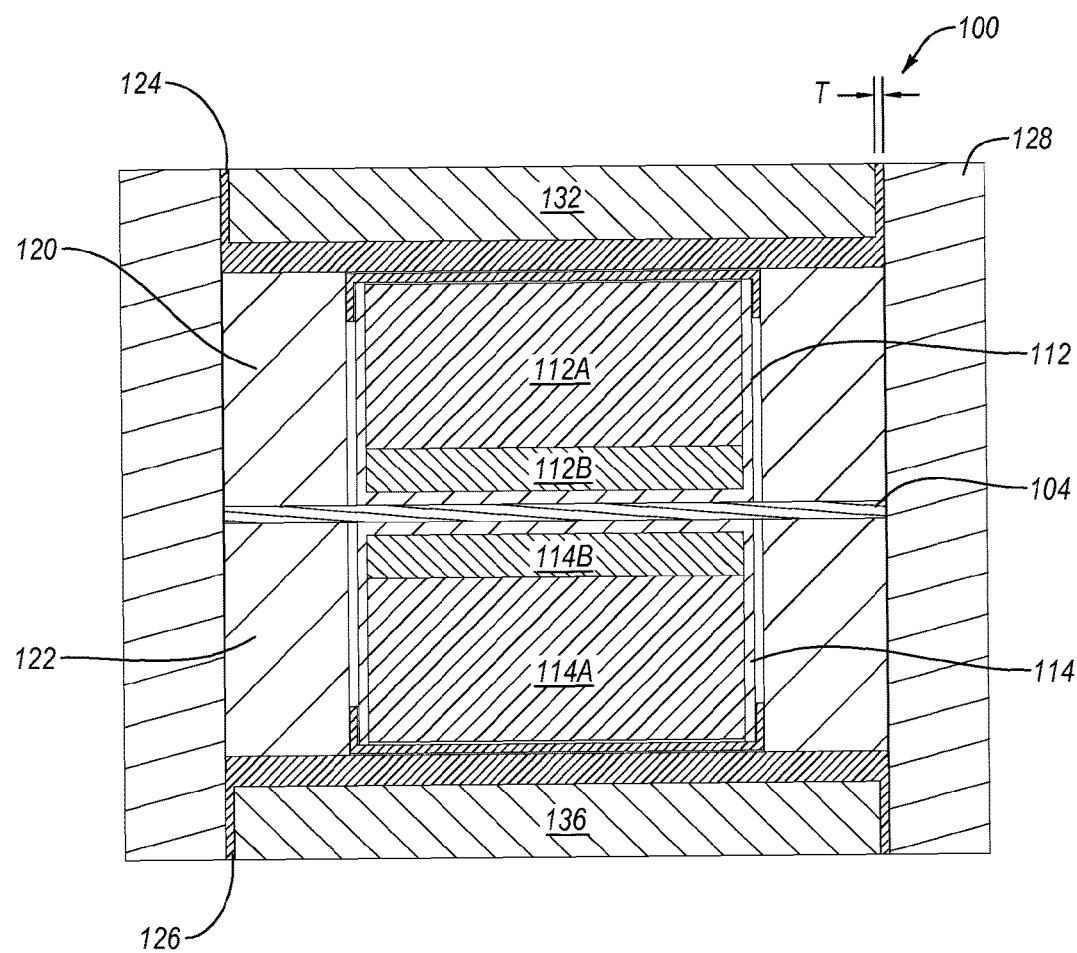
FIG. 1A is a cross-sectional view of an embodiment of a cell assembly enclosing two can assemblies each of which holds a plurality of diamond particles adjacent to a substrate.
Figure 1B:
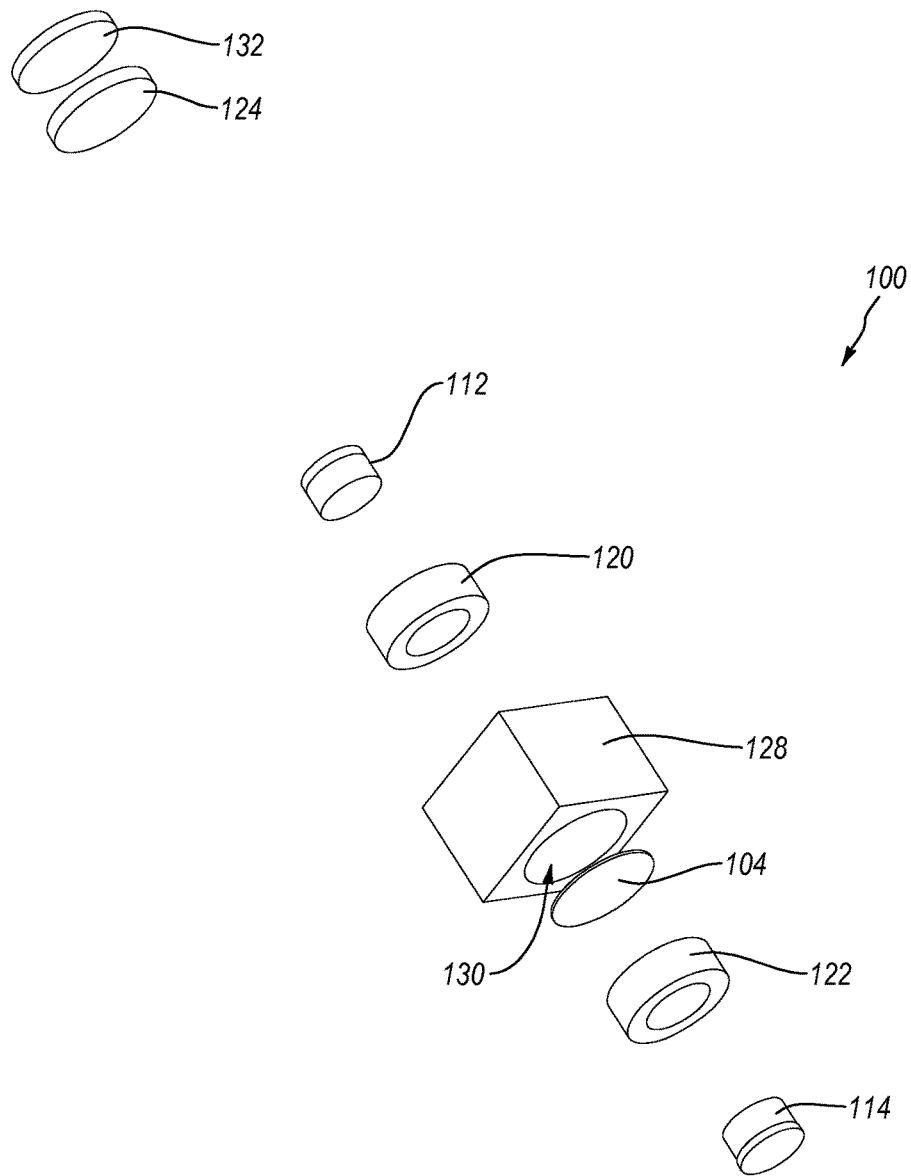
FIG. 1B is an exploded view of the cell assembly shown in FIG. 1A.
Figure 1B:
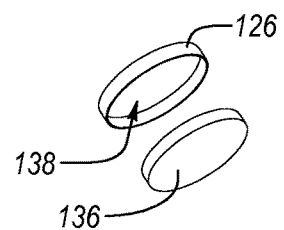

Embodiments of the invention relate to proximity heating cell assemblies for use in a high pressure cubic press used for fabricating PDCs and methods of use. FIGS. 1A and 1B are cross-sectional and exploded isometric views, respectively, of an embodiment of a cell assembly 100. The cell assembly 100 may include one or more resistance heating elements, such as heating element 104. The heating element 104 may exhibit a generally disc-like configuration and may comprise graphite or other suitable material having suitable electrical resistance properties. In other embodiments, the heating element 104 may be generally rectangular, generally elliptical, generally annular, washer-like, combinations thereof, or the like. Moreover, while one heating element is shown, in other embodiments, the cell assembly 100 may include two, three, four, or any other suitable number of heating elements.

The cell assembly 100 may include a pressure transmitting medium. For example, the cell assembly 100 may include a first substantially tubular pressure transmitting medium 120, such as a tube made from salt, which receives and extends about the can assembly 112. A second substantially tubular pressure transmitting medium 122 may receive and extend about the can assembly 114. The heating element 104 may be distally disposed adjacent to a distal end of the first substantially tubular pressure transmitting medium 120. The heating element 104 may be proximally disposed adjacent to a proximal end of the second substantially tubular pressure transmitting medium 122. Pressure transmitting mediums 120 and 122 may be salt, salt and graphite, or any other suitable pressure transmitting material. As used herein, the term "substantially tubular" encompasses tubular elements having any cross-sectional geometry, such as a generally circular cross-sectional geometry or other non-circular cross-sectional geometry.

As illustrated, the heating element 104 may divide the cell assembly 100 into two regions that receive the can assemblies 112 and 114. For example, the can assembly 112 may be received in a first region at least partially defined between a proximal anvil electrical contact 124 and the heating element 104. The can assembly 114 may be received in a second region at least partially defined between the heating element 104 and a distal anvil electrical contact 126. Each can assembly 112 and 114 may include a corresponding substrate 112A and 114A (e.g., cobalt-cemented tungsten carbide substrate) and a corresponding volume of diamond particles 112B and 114B or other type of diamond volume. Examples of suitable can assemblies and techniques for sealing such can assemblies are disclosed in U.S. Pat. No. 8,236,074 and examples of suitable techniques for cleaning diamond volumes are disclosed in U.S. Pat. No. 7,845,438; each is incorporated herein, in its entirety, by this reference. For example, the can assembly may include a refractory metal can, as disclosed in U.S. Pat. No. 7,845,438.

Although the embodiments disclosed herein are described in the context of sintering diamond particles, the diamond particles may be replaced with another type of diamond volume, such as a preformed polycrystalline diamond table that bonds to the substrate during HPHT processing. Examples of preformed polycrystalline diamond bodies include carbonate-catalyst sintered polycrystalline diamond bodies or polycrystalline diamond bodies sintered using metal-solvent catalysts (e.g., cobalt, nickel, iron, or alloys there), which may be leached to substantially remove the catalyst therefrom or unleached. For example, U.S. application Ser. No. 12/185,457 filed on 4 Aug. 2008; Ser. No. 12/495,986 filed on 1 Jul. 2009; Ser. No. 13/070,636 filed on 24 Mar. 2011; and Ser. No. 13/552,052 filed on 18 Jul. 2012 each disclose methods for manufacturing carbonate-catalyst sintered polycrystalline diamond bodies and compacts that can be fabricated in any of the cell assemblies disclosed herein and/or in which the polycrystalline diamond bodies may be employed as preformed polycrystalline diamond bodies. U.S. application Ser. No. 12/185,457 filed on 4 Aug. 2008; Ser. No. 12/495,986 filed on 1 Jul. 2009; Ser. No. 13/070,636 filed on 24 Mar. 2011; and Ser. No. 13/552,052 are each incorporated herein, in its entirety, by this reference.

As shown in FIG. 1A, the diamond particles 112B, 114B within the respective can assemblies 112, 114 may be positioned toward and near the heating element 104 or the heating element 104 may be positioned between the diamond particles 112B and the diamond particles 114B. Accordingly, the heating element 104 may be configured to heat the diamond particles 112B and/or the diamond particles 114B before heating the substrate 112A and/or the substrate 114A of the can assemblies 112, 114. For example, in an embodiment, at least a portion of heat flow from the heating element 104 may first pass through the diamond particles 112B or diamond particles 114B before the heat flow reaches the distal end region of the substrate 112A or the proximal end region of the substrate 114A. Such a configuration may help create a desired thermal gradient near the heating element 104 and the diamond particles 112B, 114B, thus requiring less time and energy to sinter the diamond particles 112B, 114B. Moreover, such a configuration may allow the heating element 104 to heat both the diamond particles 112B and the diamond particles 114B at substantially the same time; simultaneously, or nearly simultaneously.

Thus, the heating element 104 may be configured to provide heating or generally generate heating near targeted locations within the can assemblies 112, 114 and/or to influence heating patterns and/or gradients within the can assemblies 112, 114. Such a configuration may allow higher sintering temperatures because the heating element 104 can provide heating to targeted locations without overheating other portions of the can assemblies 112, 114.

Referring still to FIGS. 1A and 1B, a proximal anvil electrical contact 124 may be proximally disposed adjacent to a proximal portion of can assembly 112 and may electrically contact the can assembly 112. A distal anvil electrical contact 126 may be distally disposed adjacent to a distal portion of the can assembly 114 and may electrically contact the can assembly 114. The proximal and distal anvil electrical contacts 124, 126 may be made from steel, titanium, molybdenum, zirconium, TZM molybdenum metal alloys, combinations thereof, or any other suitable electrically conductive material. For example, in an embodiment, the anvil electrical contacts 124 and/or 126 may be made from titanium and/or zirconium. Such a configuration may help reduce heat transfer out of the ends of the cell assembly 100 due to the lower thermal conductivity of the titanium and/or the zirconium compared to steel. Such a configuration may also help reduce the thickness of the anvil electrical contacts. For example, in an embodiment, the proximal anvil electrical contact 124 and/or the distal anvil electrical contact 126 may exhibit a thickness T of about 0.01 inches, about 0.02 inches, about 0.03 inches, about 0.04 inches, about 0.05 inches, about 0.06 inches, about 0.07 inches, about 0.08 inches or about 0.09 inches. In other embodiments, the proximal anvil electrical contact 124 and/or the distal anvil electrical contact 126 may exhibit a thickness T between about 0.01 inches and about 0.1 inches; about 0.02 inches and 0.09 inches; about 0.03 inches and about 0.08 inches; about 0.04 inches and about 0.07; about 0.01 inches and about 0.05 inches; or about 0.02 inches and about 0.04 inches. In other embodiments, the thickness T of at least one of the proximal anvil electrical contact 124 or the distal anvil electrical contact 126 may be larger or smaller.

The cell assembly 100 may further include a gasket medium 128 generally in the shape of a cube. The gasket medium 128 may define a receiving space 130 that receives the heating element 104, pressure transmitting mediums 120, 122, and can assemblies 112, 114. The receiving space 130 (FIG. 1B) may also at least partially receive the proximal and distal anvil electrical contacts 124, 126. A plug 132 may be disposed in an opening (not shown) defined by the proximal anvil electrical contact 124 and a plug 136 may be disposed in an opening 138 (FIG. 1B) defined by the distal anvil electrical contact 126. The gasket medium 128 and the plugs 132 and 136 may comprise any suitable gasket material, such as any material disclosed in U.S. Pat. No. 6,338,754, which is incorporated herein, in its entirety, by this reference. Another example of a suitable material for the gasket medium 128 and the plugs 132 and 136 is pyrophyllite, which is commercially available from Wonderstone Ltd. of South Africa. In other embodiments, the gasket medium 128 and plugs 132 and 136 may comprise different materials, without limitation.

Figure 1C:
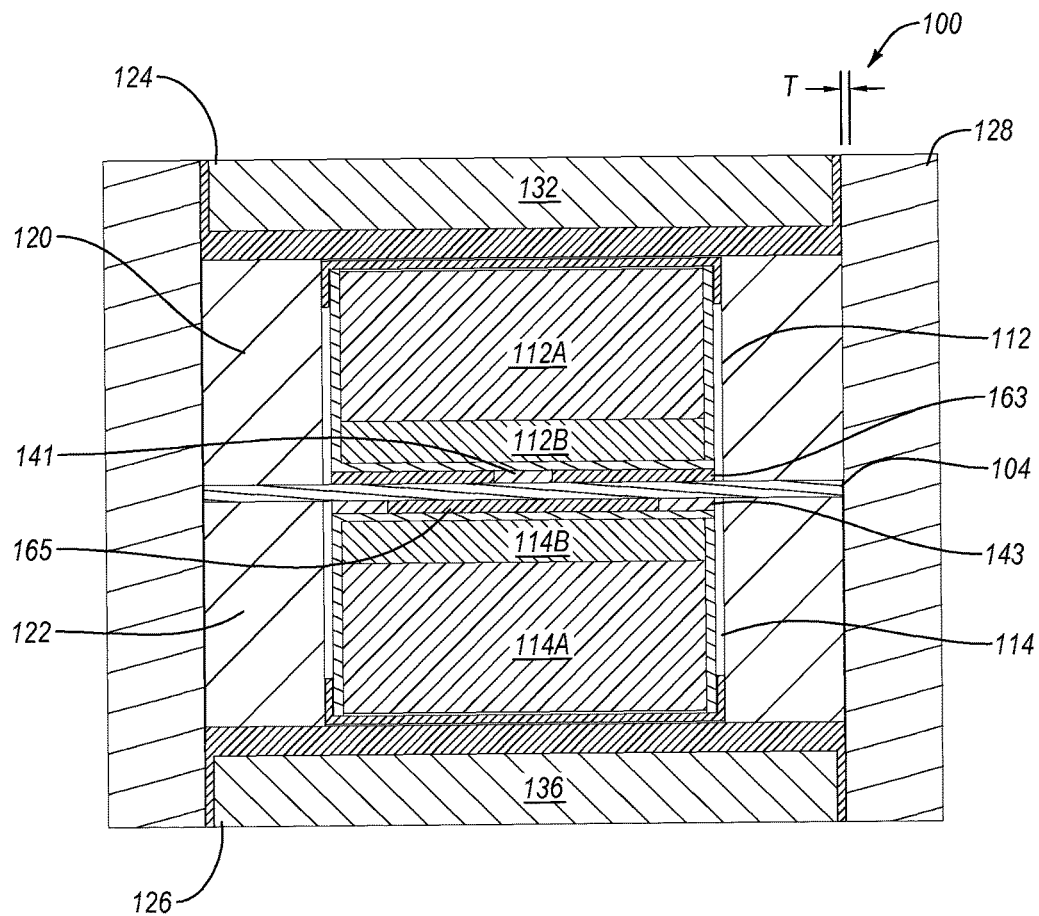
FIG. 1C is a cross-sectional view of the cell assembly shown in FIG. 1A according to another embodiment.

Optionally, the cell assembly 100 may include a heat spreader. A heat spreader is a device or structure that includes one or more geometric features configured to help influence heat transfer. For example, FIG. 1C is a cross-sectional view of the cell assembly 100 including a disc-like electrical contact 141 and a ring-like electrical contact 143 according to an embodiment. As shown, insulators 163 and 165 may be disposed between the heating element 104 and the can assemblies 112 and 114. In an embodiment, an insulator ring 163 may be disposed between a distal end surface of can assembly 112 and the heating element 104 and an insulator disc 165 may be disposed between a proximal end surface of can assembly 114 and the heating element 104. Insulators 163 and/or 165 may comprise mica and/or may be made from salt or any other suitable material. The disc-like electrical contact 141 may be positioned within the central opening of the insulator ring 163 and may electrically contact the can assembly 112 and the heating element 104. The ring-like electrical contact 143 positioned between the can assembly 114 and the heating element 104 and may electrically contact the can assembly 114 and the heating element 104. In an embodiment, the insulator disc 165 may be positioned within the central opening of the ring-like electrical contact 143. Optionally, the disc-like electrical contact 141 and/or the ring-like electrical contact may further be configured as additional heating elements. As described below in relation to FIGS. 1E and 1F, by changing the direction of current flow between the disc-like electrical contact 141 and the ring-like electrical contact 143 relative to the heating element 104, the direction and/or location of current flow through the heating element 104 may be varied and/or controlled. Consequently, the size, intensity, and heating pattern of the heating element 104 may also be localized, varied, and/or controlled to influence the heating characteristics of the diamond particles 112B, 114B.

Figure 1D:
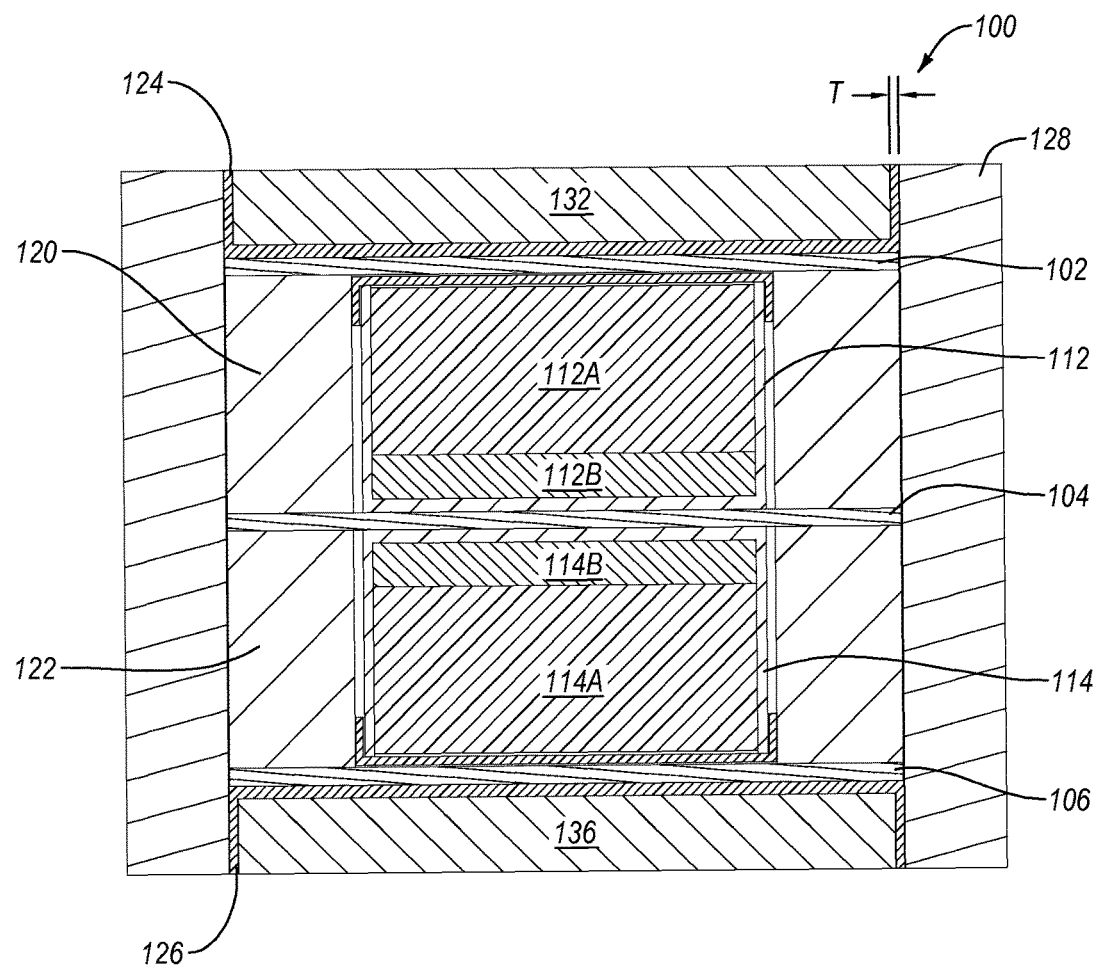
FIG. 1D is a cross-sectional view of the cell assembly shown in FIG. 1A according to another embodiment.

The cell assembly 100 may include heating elements of varying configurations. For example, FIG. 1D is a cross-sectional view of the cell assembly 100 including three heating elements according to an embodiment. In an embodiment, cell assembly 100 may include heating elements 102, 104, and 106. At least one of the heating elements 102, 104, 106 may exhibit a generally disc-like configuration and may comprise graphite or other suitable material having suitable electrical resistance properties. In other embodiments, the heating elements 102, 104, 106 may be washer-like, generally rectangular, generally elliptical, generally annular, or the like. Moreover, while three heating elements are shown, in other embodiments, the cell assembly 100 may include one, two, four, or any other suitable number of heating elements.

The heating element 102 may be proximally disposed adjacent to the proximal end of the first substantially tubular pressure transmitting medium 120 and the heating element 104 may be distally disposed adjacent to the distal end of the first substantially tubular pressure transmitting medium 120. The heating element 104 may be proximally disposed adjacent to the proximal end of the second substantially tubular pressure transmitting medium 122 and the heating element 106 may be distally disposed adjacent to the distal end of the second substantially tubular pressure transmitting medium 122.

Similar to FIG. 1A, the heating element 104 may divide the cell assembly 100 into two regions that receive the can assemblies 112 and 114. In an embodiment, the can assembly 112 may be received in a first region at least partially defined between the heating element 102 and the heating element 104. The can assembly 114 may be received in a second region at least partially defined between the heating element 104 and the heating element 106.

Figure 1E:
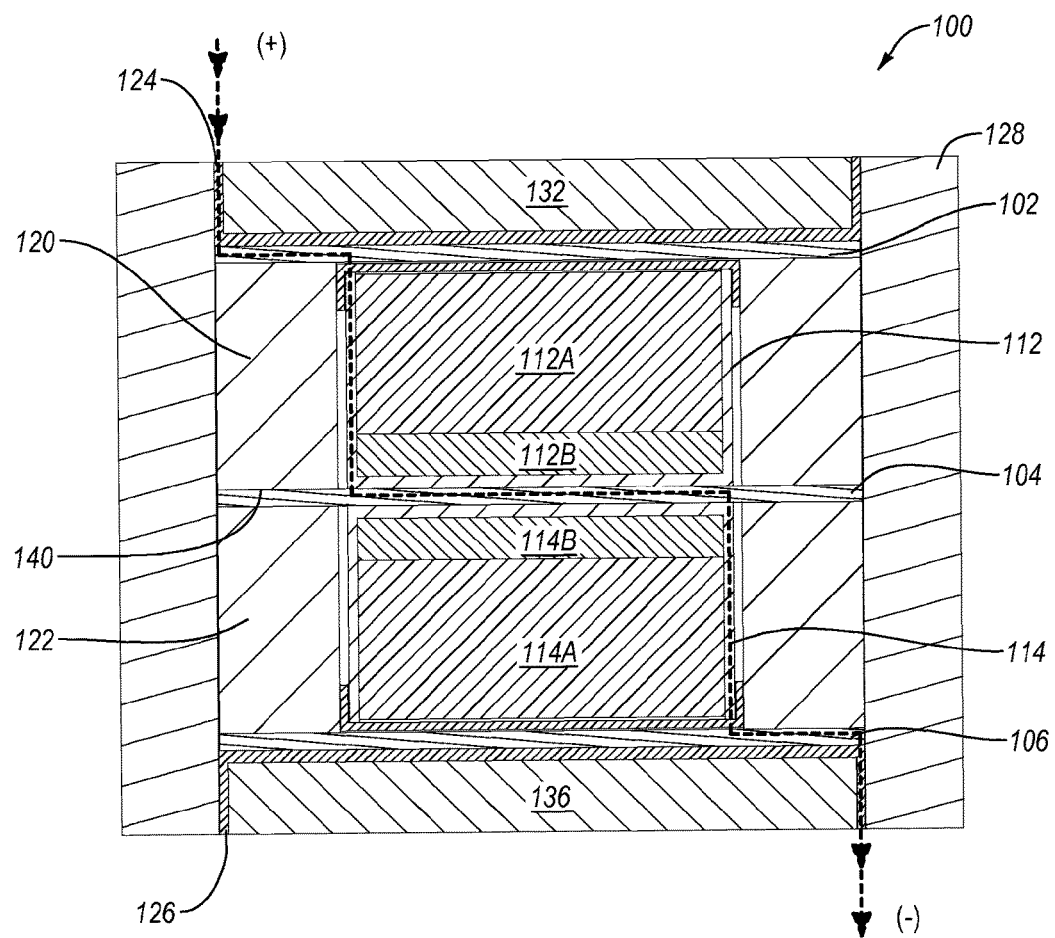
FIG. 1E is a cross-sectional view of the cell assembly shown in FIG. 1D that details a current path according to an embodiment.
Figure 1F:
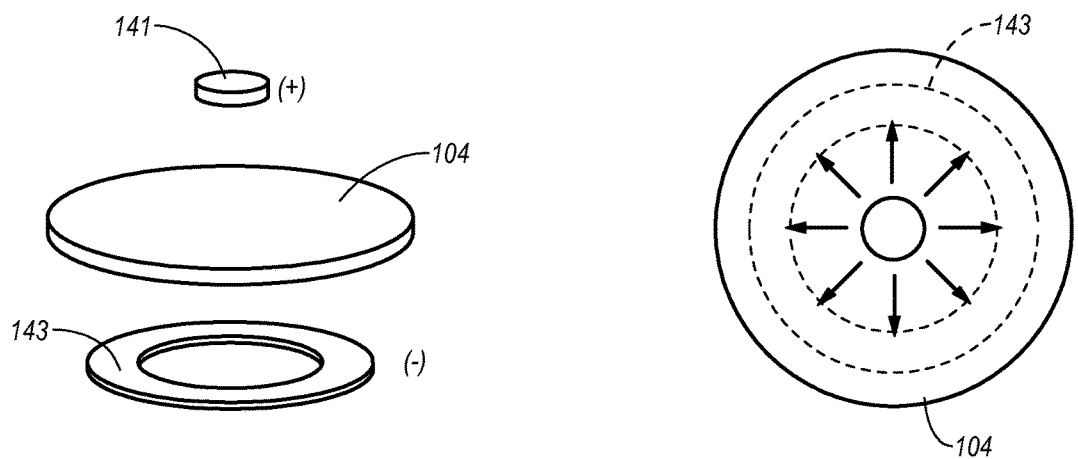
FIG. 1F is a partial, exploded isometric view of electrical contacts configured as a heat spreader shown in FIG. 1C that details a current path according to an embodiment.
Figure 1G:
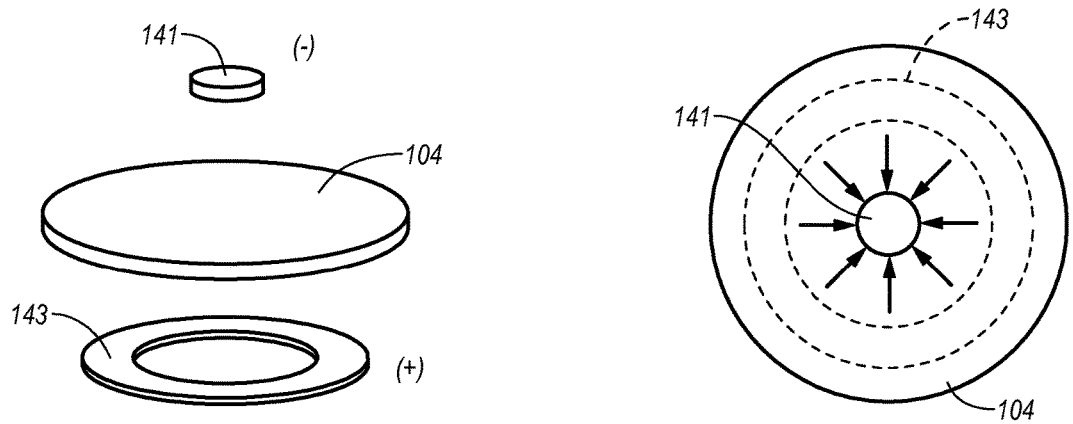
FIG. 1G is a partial, exploded isometric view of the electrical contacts shown in FIG. 1C that details a current path according to another embodiment.
Figure 1H:
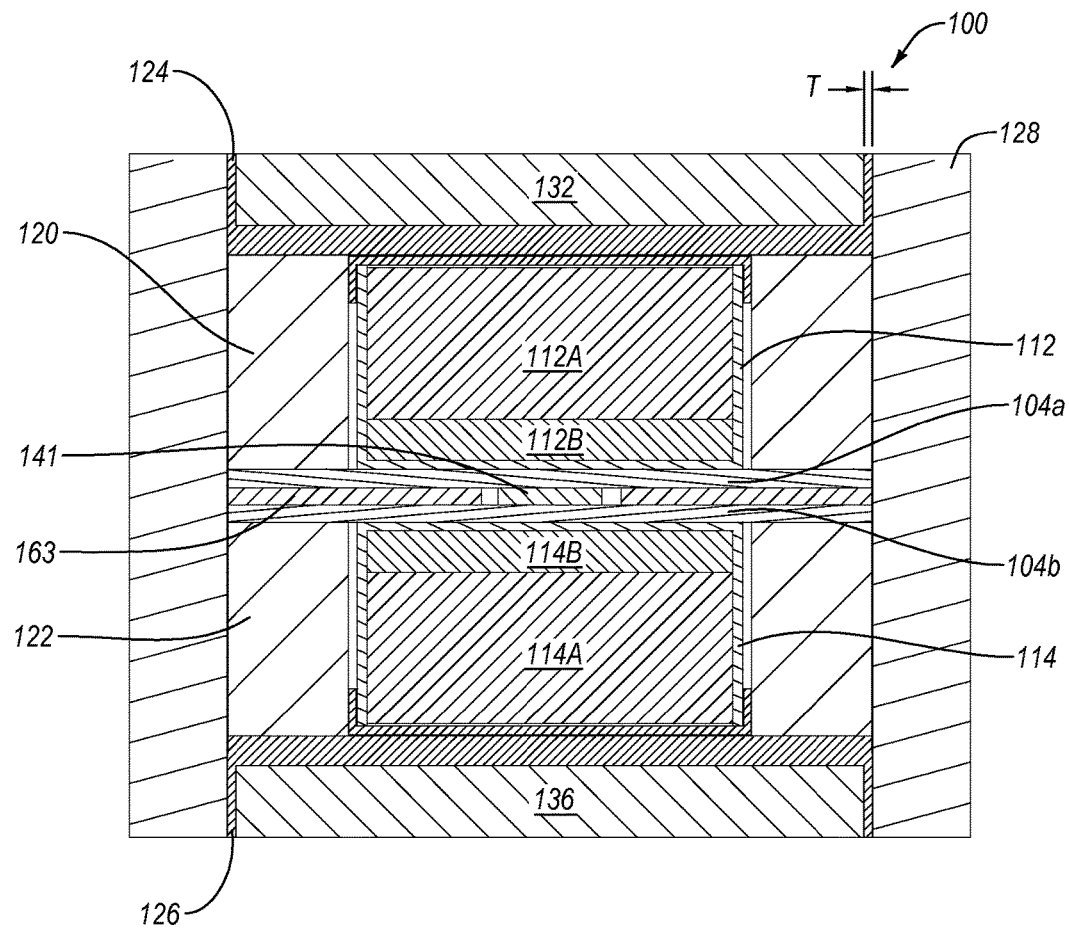
FIG. 1H is a cross-sectional view of the cell assembly shown in FIG. 1A according to another embodiment.

As shown in FIG. 1D, the diamond particles 112B, 114B within the respective can assemblies 112, 114 may be positioned toward and near the heating element 104 or the heating element 104 may be positioned between the diamond particles 112B and the diamond particles 114B. In an embodiment, the heating element 102 may include a major surface or a proximal surface generally opposing an end surface of the can assembly 112 and the heating element 106 may include an opposite major surface or end surface generally opposing an end surface of the can assembly 114. Accordingly, the heating element 104 may be configured to heat the diamond particles 112B and/or the diamond particles 114B before heating the substrate 112A and/or the substrate 114A of the can assemblies 112, 114. For example, in an embodiment, at least a portion of heat generated by the heating element 104 may first transfer through the diamond particles 112B or diamond particles 114B before reaching the distal end region of the substrate 112A or the proximal end region of the substrate 114A. Such a configuration may help create a desired thermal gradient near the heating element 104 and the diamond particles 112B, 114B, thus requiring less time and energy to sinter the diamond particles 112B, 114B. Moreover, such a configuration may allow the heating element 104 to heat both the diamond particles 112B and the diamond particles 114B at substantially the same time; simultaneously, or nearly simultaneously. In other embodiments, more than one heating element may be positioned between the can assemblies 112 and 114. For example, as shown in FIG. 1H, the diamond particles 112B of can assembly 112 may be positioned near a heating element 104A and the diamond particles 114B of can assembly 114 may be positioned near a heating element 104B. An insulator ring 163 may be positioned between heating element 104A and heating element 104B. In an embodiment, a disc-like electrical contact 141 may be positioned within the central opening of the insulator ring 163. Such a configuration may help localize, vary, and/or control the size, intensity, and heating pattern of the heating elements 104A, 104B.

Referring again to FIG. 1D, the heating element 102 may be positioned near a proximal end portion of the substrate 112A and the heating element 106 may be positioned near a distal end portion of substrate 114A. The heating element 102 may heat the proximal portion of the substrate 112A while the heating element 106 may heat the distal portion of the substrate 114A. In other embodiments, can assemblies 112 and/or 114 may be inverted. For example, in an embodiment, can assemblies 112 and 114 may be may be inverted such that heating element 102 is positioned near diamond particles 112B and heating element 106 is positioned near diamond particles 114B. As a result, heating element 102 may be configured to heat diamond particles 112B before substrate 112A and heating element 106 may be configured to heat diamond particles 114B before substrate 114A. Thus, the heating elements 102, 104, 106 may be configured to provide heating or generally generate heating near targeted locations within the can assemblies 112, 114 and/or to influence heating patterns or gradients within the can assemblies 112, 114. Such a configuration may allow higher sintering temperatures because the heating elements 102, 104, and 106 can provide heating to targeted locations without overheating other portions of the can assemblies 112, 114.

Referring still to FIG. 1D, the proximal anvil electrical contact 124 may be proximally disposed adjacent to the heating element 102 and may electrically contact the heating element 102. The distal anvil electrical contact 126 may be distally disposed adjacent to the heating element 106 and may electrically contact the heating element 106.

The cell assembly 100 may be configured such that electrical energy may pass through the cell assembly 100 in a number of different ways. For example, FIG. 1E is a cross-sectional view of the cell assembly shown in FIG. 1D that details how an electrical current may pass through the cell assembly 100 according to an embodiment. An electrical current may pass from an anvil of an ultra-high pressure press (shown in FIG. 2) to the proximal anvil contact 124. From the proximal anvil contact 124, the electrical current may pass to the heating element 102 and then to the can assembly 112. From the can assembly 112, the electrical current may then pass to the heating element 104. The electrical current may then pass from the heating element 104 to the can assembly 114. From the can assembly 114, the electrical current may pass to the heating element 106, through the distal anvil electrical contact 126 and out of the cell assembly 100. As discussed above, the heating elements 102, 104, 106 may convert electrical energy into heat to heat the contents of the can assemblies 112, 114.

In other embodiments, the electrical current pathway may pass through a heat spreader. For example, FIGS. 1F and 1G are partial, exploded isometrics views of heating element 104 and the disc-like electrical contact 141 and the ring-like electrical contact 143 shown in FIG. 1C. In the illustrated embodiment, the disc-like electrical contact 141 may electrically contact a proximal portion of the heating element 104 and the ring-like electrical contact 143 may electrically contact a distal portion of the heating element 104. Like the proximal and distal electrical contacts, the electrical contacts 141 and 143 may each comprise a suitable electrically conductive and temperature-resistant material. For example, electrical contacts 141 and 143 may comprise steel, titanium, molybdenum, TZM molybdenum metal alloys, combinations thereof, or any other suitable electrically conductive material.

In the illustrated embodiment, the ring-like electrical contact 143 may include an inner diameter which is greater than an outer diameter of the disc-like electrical contact 141. The disc-like electrical contact 141 may be positioned over the central opening of the ring-like electrical contact 143. In FIG. 1F, electrical current may pass in a first direction from the disc-like electrical contact 141 (+), through the heating element 104 and to the ring-like electrical contact 143 (−). Because the disc-like electrical contact 141 is positioned over the central opening of the ring-like electrical contact 143, the electrical current may flow radially outward from the disc-like electrical contact 141 through the heating element 104 toward the body of the ring-like electrical contact 143. In FIG. 1G, the direction of the electrical current may be reversed such that the electrical current flows in a second direction from the ring-like electrical contact 143 (+), through the heating element 104 and to the disc-like electrical contact 141 (−). Electrical current flowing in the second direction may flow radially inward from the ring-like electrical contact 143 through the heating element 104 toward the disc-like electrical contact 141. Thus, by changing the direction of current flow between the electrical contacts 141, 143 and/or the size and/or location of the electrical contacts 141, 143 relative to the heating element 104, the direction and/or location of current flow through the heating element may be varied and/or controlled. Consequently, the size, intensity, and heating pattern of the heating element 104 may also be localized, varied and/or controlled to influence the heating characteristics of the diamond particles 112B, 114B.

While the electrical contacts 141, 143 are shown electrically contacting the distal and proximal portions of the heating element 104, it will be appreciated that the electrical contacts 141, 143 may electrically contact any portion of the heating elements 102, 104, or 106.

Figure 2:
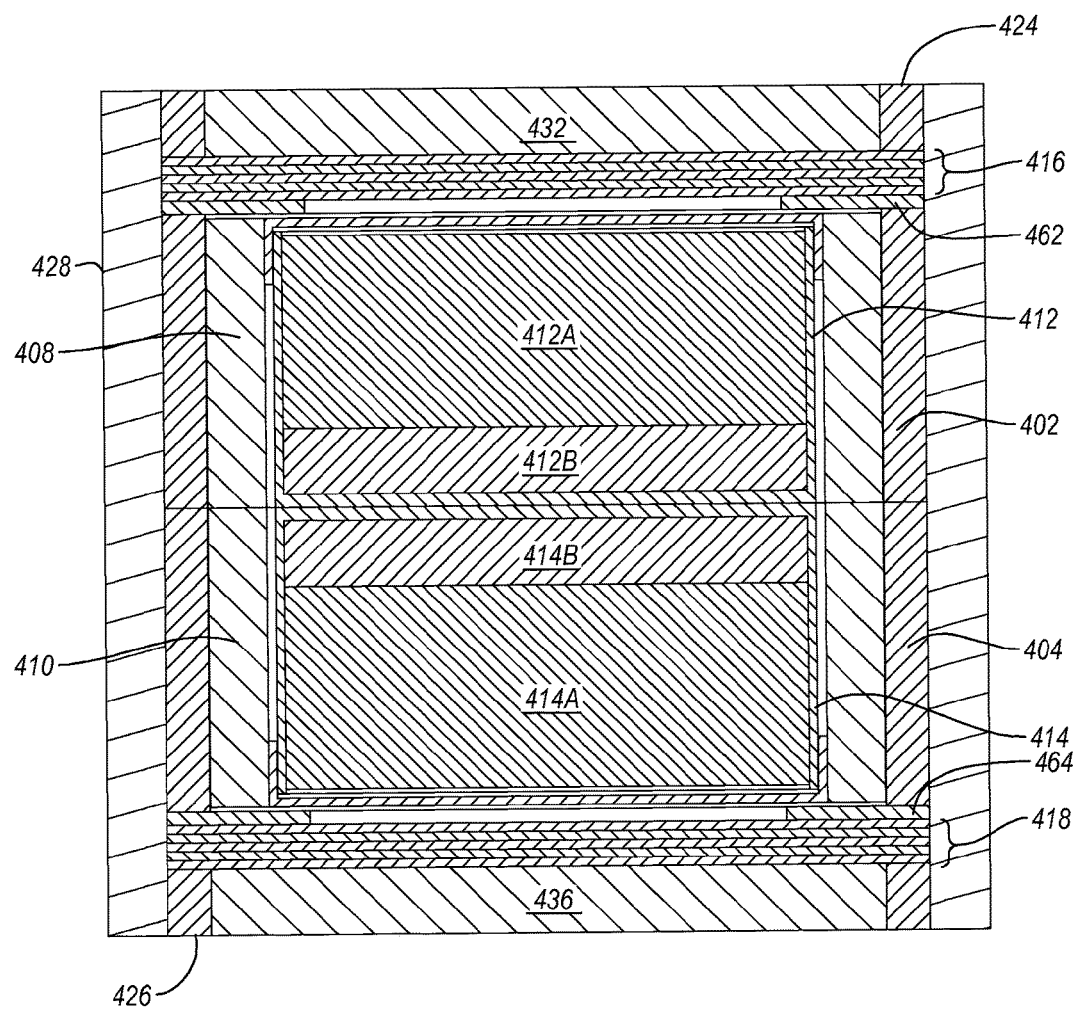
FIG. 2 is a partial isometric view of an ultra-high pressure cubic press configured to apply pressure to the cell assembly shown in FIG. 1A and substantially simultaneously pass current through the heating element shown in FIG. 1A to generate diamond-stable HPHT conditions.

The use of the cell assembly 100 shown in FIG. 1A for fabricating two PDCs is explained with reference to FIG. 2, which is a partial isometric view of an ultra-high pressure cubic press 200 configured to apply pressure to the cell assembly 100 and pass current through the heating elements (e.g., 102, and/or 104, and/or 106) to generate diamond-stable HPHT conditions. In use, the cell assembly 100 including the can assemblies 112 and 114 therein is placed in a reaction zone of the ultra-high pressure press 200. A plurality of anvils 241-246 of the ultra-high pressure press 200 apply a selected pressure to respective faces of the cell assembly 100. In an embodiment, the anvils 241 and 244 may establish electrical contact with proximal anvil electrical contact 124 and the distal anvil electrical contact 126. A selected current may be controllably passed through the heating elements 102, 104, 106 to thereby heat the contents of the can assemblies 112, 114. As discussed above, the heating element 104 may be positioned between the diamond particles 112B, 114B of the can assemblies 112, 114 such that the heating element 104 may heat the diamond particles 112B, 114B before heating the substrates 112A, and 114A. The heating element 102 may be positioned toward the proximal portion of the substrate 112A of the can assembly 112 and the heating element 106 may be positioned toward the distal portion of the substrate 114A of the can assembly 114.

The heating may be sufficient to heat the contents of the can assemblies 112 and 114 to about 1200° C. to about 2400° C., to about 1400° C. to about 2200° C., or to about 1600° C. to about 2000° C., while the anvils 241-246 apply a pressure to the contents of the can assemblies 112 and 114 of at least about 4 GPa, such as about 5 GPa to about 12 GPa, about 6 GPa to about 11 GPa, or about 7 GPa to about 10 GPa. Subjecting the can assemblies 112 and 114 to the HPHT process results in two PDCs being formed. One PDC comprises the substrate 112A that is bonded to a polycrystalline diamond table formed from the diamond particles 112B that are sintered and another PDC comprises the substrate 114A that is bonded to a polycrystalline diamond table formed from the diamond particles 114B that are sintered. However, in other embodiments, the cell assembly 100 may be employed for fabricating one, three, or four or more PDCs of various shapes and sizes (e.g., PDC configurations other than the illustrated cylindrical configurations).

Controlling the heating characteristics within the can assemblies 112, 114 may help reduce processing time and/or the cost of fabricating PDCs. For example, subjecting the can assemblies 112, 114 to the HPHT process may cause a constituent of the substrates 112A, 114A, such as cobalt from a cobalt-cemented tungsten carbide substrate to liquefy and sweep from a region adjacent to the volume of diamond particles 112B, 114B into interstitial regions between the diamond particles 112B, 114B. The cobalt may act as a catalyst to promote intergrowth between the diamond particles 112B, 114B, which results in formation of directly bonded-together diamond grains exhibiting diamond-to-diamond bonding (e.g., $sp^3$ bonding). During the HPHT process, other components of the cemented carbide substrate, such as tungsten and carbon, may also migrate into the interstitial regions between the diamond crystals. The diamond grains become mutually bonded to form a polycrystalline diamond table, with interstitial regions between the bonded diamond grains being occupied by the cobalt (or another suitable catalyst) and other components, if any. In some embodiments, after the matrix of polycrystalline diamond is formed, the polycrystalline diamond may be leached to at least partially remove or substantially completely remove the catalyst. In other embodiments, when a carbonate-catalyst material is mixed with the diamond particles (optionally in the absence of the substrates) to form a polycrystalline diamond body, the cell assembly 100 is well suited for heating to temperatures sufficient for employing carbonate-catalyst and/or other non-elemental catalyst materials, such as greater than about 2000° C.

It is currently believed that subjecting the can assemblies 112, 114 to the HPHT process may also cause a constituent of one or more can of the can assemblies 112, 114, such as niobium, to migrate into the interstitial regions between the diamond particles 112B, 114B such that the niobium may become incorporated with the cobalt. When niobium becomes incorporated with the cobalt, it can tend to inhibit leaching of the cobalt and the leaching process may become more complicated, time consuming, and expensive.

By positioning the heating element 104 between the diamond particles 112B and the diamond particles 114B, the heating element 104 may shift the heating pattern toward the region between the diamond particles 112B, 114B and away from the cans of can assemblies 112, 114 in the region adjacent the diamond particles 112B, 114B, and the substrates 112A, 114A. Such a configuration may help reduce concentrations of chemical constituents of the can assemblies 112, 114 (e.g., niobium) that may become incorporated with the cobalt, thereby, resulting in a leaching process that is simpler, faster, and less expensive.

In other embodiments, cell assemblies may include heating elements of varying configurations. For example, proximal electrical contacts may be disposed adjacent to and/or near the proximal end of the first can assembly 112 and electrically contacting a periphery of the can assembly 112. Distal electrical contacts may be disposed adjacent to and/or near the distal end of the second can assembly 114 and electrically contacting a periphery of the can assembly 114. As a result, electrical current may travel from the proximal anvil electrical contact 124, to can assembly 112, to the heating element 104, to the can assembly 114, and to the distal anvil electrical contact 126. Such a configuration may help provide central direct heating of the diamond particles 112B, 114B.

Figure 3A:
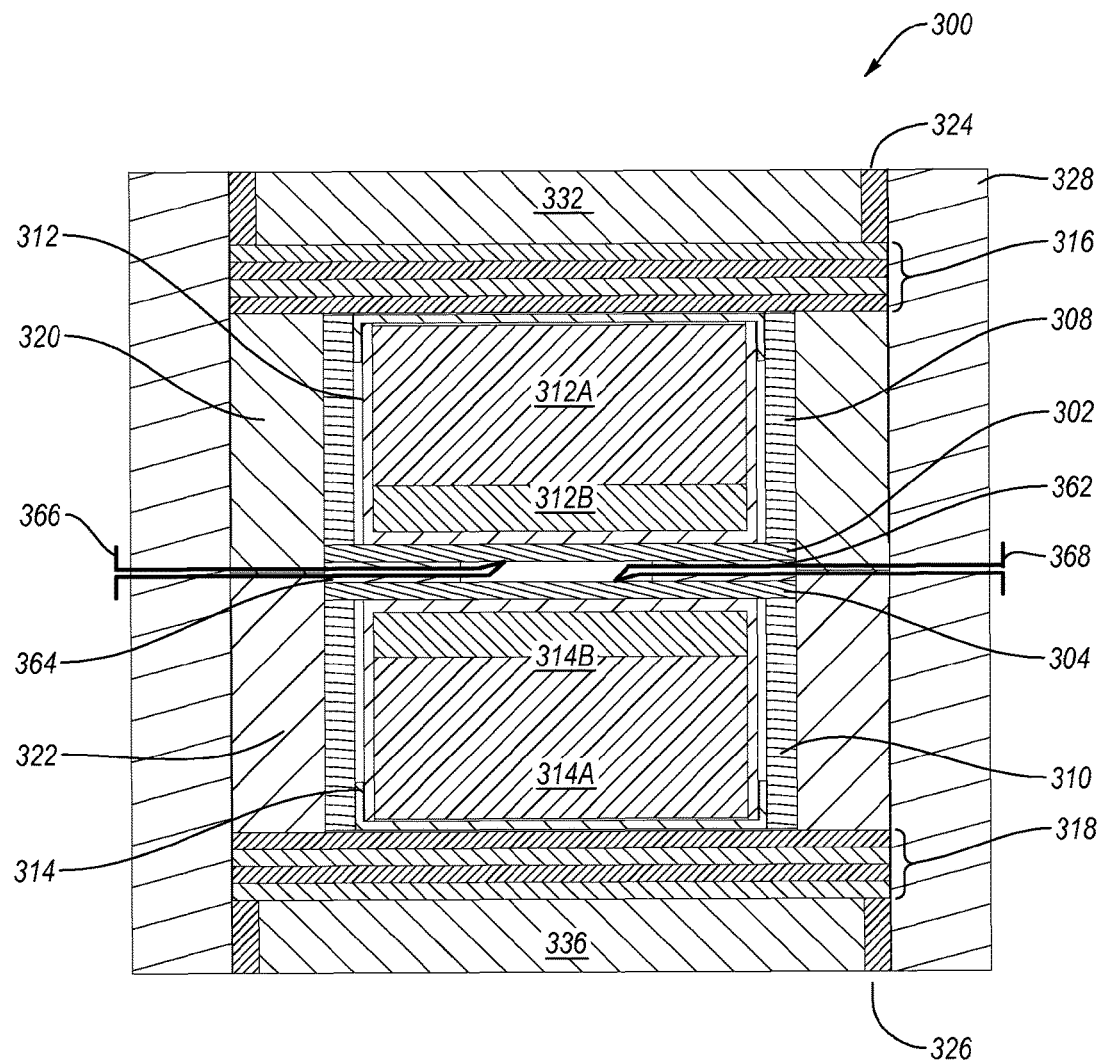
FIG. 3A is a cross-sectional view of an embodiment of a cell assembly enclosing two can assemblies each of which holds a plurality of diamond particles adjacent to a substrate.
Figure 3B:
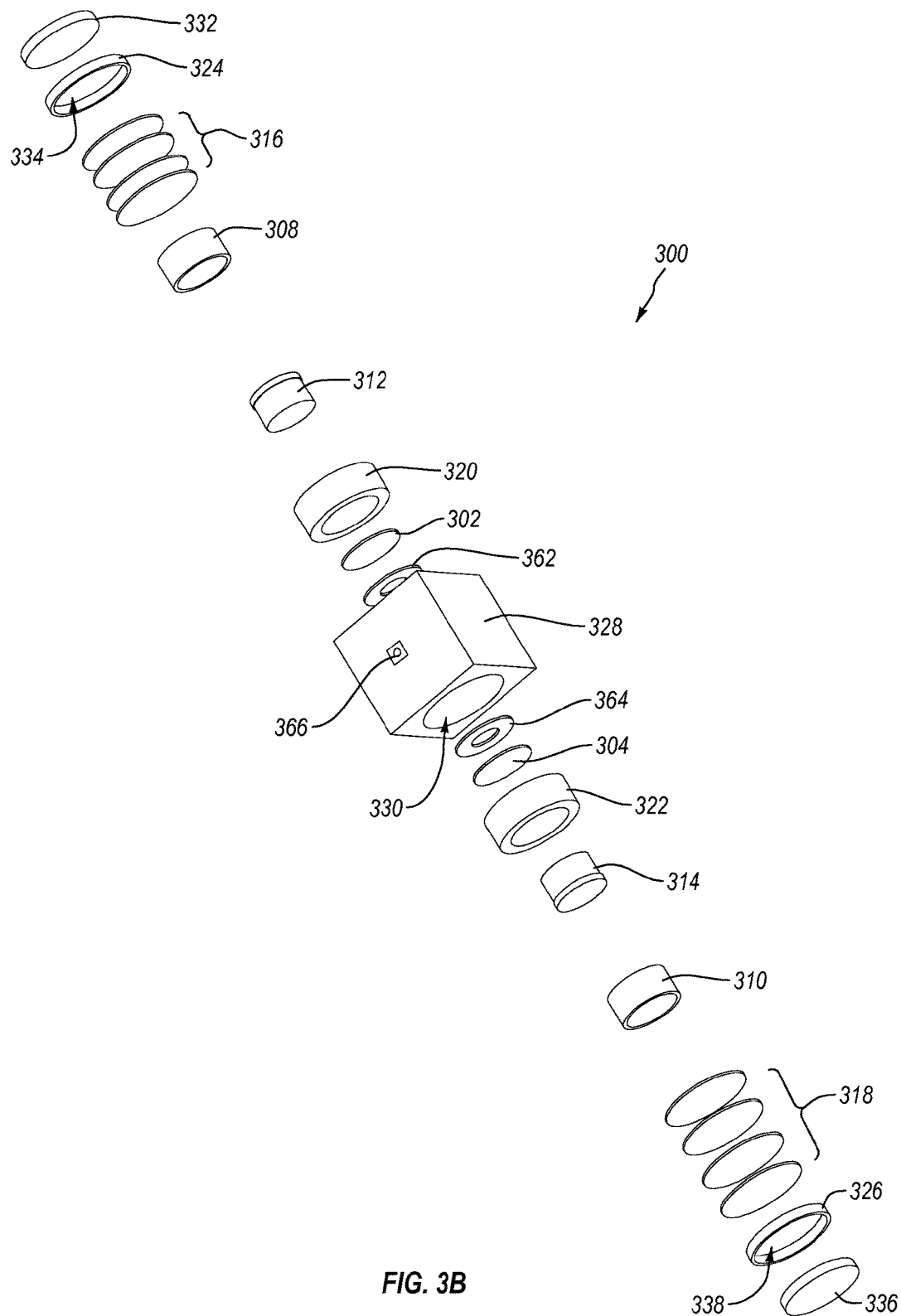
FIG. 3B is an exploded view of the cell assembly shown in FIG. 3A.

FIGS. 3A and 3B are cross-sectional and exploded isometric views, respectively, of an embodiment of a cell assembly 300 according to another embodiment. The cell assembly 300 has many of the same components and features that are included in the cell assembly 100 of FIGS. 1A-2. Therefore, in the interest of brevity, the components and features of the cell assembly 100 and 300 that correspond to each other or are otherwise similar in some aspect have been provided with identical reference numbers, and an explanation thereof will not be repeated. However, it should be noted that the principles of the cell assembly 300 may be employed with any of the embodiments described in relation to FIGS. 1A-2 and vice versa.

The cell assembly 300 may include one or more resistance heating elements, such as first and second heating elements 302 and 304. Like the heating elements of cell assembly 100, the heating elements 302, 304 may comprise graphite or any other suitable material. A pressure transmitting medium (e.g., comprising salt, salt and graphite, etc.), such as first and second tubular liners 308 and 310 may be disposed distal and proximal the heating elements 302, 304.

Insulators may be disposed between the heating elements 302, 304. For example, insulators 362, 364 may be disposed between heating element 302 and heating element 304. In an embodiment, the insulators 362, 364 may divide the cell assembly 300 into two chambers that receive can assemblies 312 and 314. The insulators 362, 364 may comprise mica washers or discs and/or may be made from salt or any other suitable material. The can assemblies 312, 314 may be configured similar to can assemblies 112, 114. For example, each can assembly 312 and 314 may include a corresponding substrate 312A and 314A (e.g., cobalt-cemented tungsten carbide substrate) and a corresponding volume of diamond particles 312B and 314B. As shown, heating element 302 may be positioned in proximity to the volume of diamond particles 312B of can assembly 312. A proximal surface of heating element 302 may be generally opposing a distal end surface of the can assembly 312. In an embodiment, the proximal surface of the heating element 302 may be generally parallel the distal end surface of the can assembly 312. Similarly, heating element 304 may be positioned in proximity the volume of diamond particles 314B of can assembly 314. A distal surface of heating element 304 may be generally opposing a proximal end surface of the can assembly 314. In an embodiment, the distal surface of the heating element 304 may be generally parallel the proximal end surface of the can assembly 314. Generally parallel, as used herein, means between two surfaces that form less than about a forty-five degree angle between them. By positioning the heating element 302 in proximity the diamond particles 312B, the heating element 302 may heat the diamond particles 312B before the substrate 312A. Similarly, heating element 304 may heat the diamond particles 314B before the substrate 314A. Such a configuration may help provide preferential heating to the diamond particles 312B, 314B, thereby requiring less energy to sinter the diamond particles 312B, 314B. Moreover, such a configuration may allow higher sintering temperatures because the heating elements 302, 304 provide sufficient heating to sinter the diamond particles 312B, 314B, without overheating other portions of the can assemblies 312, 314. In yet other embodiments, one or both of the heating elements 302, 304 may be configured to preferentially heat both the diamond particles 312B and the diamond particles 314B.

Optionally, the cell assembly 300 may further include one or more temperature measuring devices configured to measure the temperature of the heating elements and/or contents of the can assemblies. For example, in the illustrated embodiment, the cell assembly 300 may include temperature measuring devices 366, 368 comprising thermocouples that extend laterally relative to a longitudinal axis of the can assembly 300 and electrically contact a portion of heating elements 302 and/or 304. In an embodiment, the thermocouples may include titanium. In other embodiments, the thermocouples may include steel, nickel, iron, platinum, rhodium, tungsten, metal alloys, or any other suitable electrically conductive and temperature resistant material for measuring temperature. In other embodiments, the cell assembly 300 may include at least one temperature measuring device (e.g., at opposite ends of the can assemblies 312, 314 and/or cell assembly 300) such that the at least one temperature measuring device can measure at least one temperature gradient or optionally more than one temperature in the can assemblies 312, 314 and/or the cell assembly 300. In other embodiments, the cell assembly 300 may include at least one temperature measuring device comprising at least one of temperature sensors, thermistors, thermostats, resistive temperature devices, noncontact sensors that measure thermal radiant power of infrared or optical radiation, combinations thereof, or other suitable types of temperature measuring devices. In other embodiments, the temperature measuring devices may be omitted.

Figure 3C:
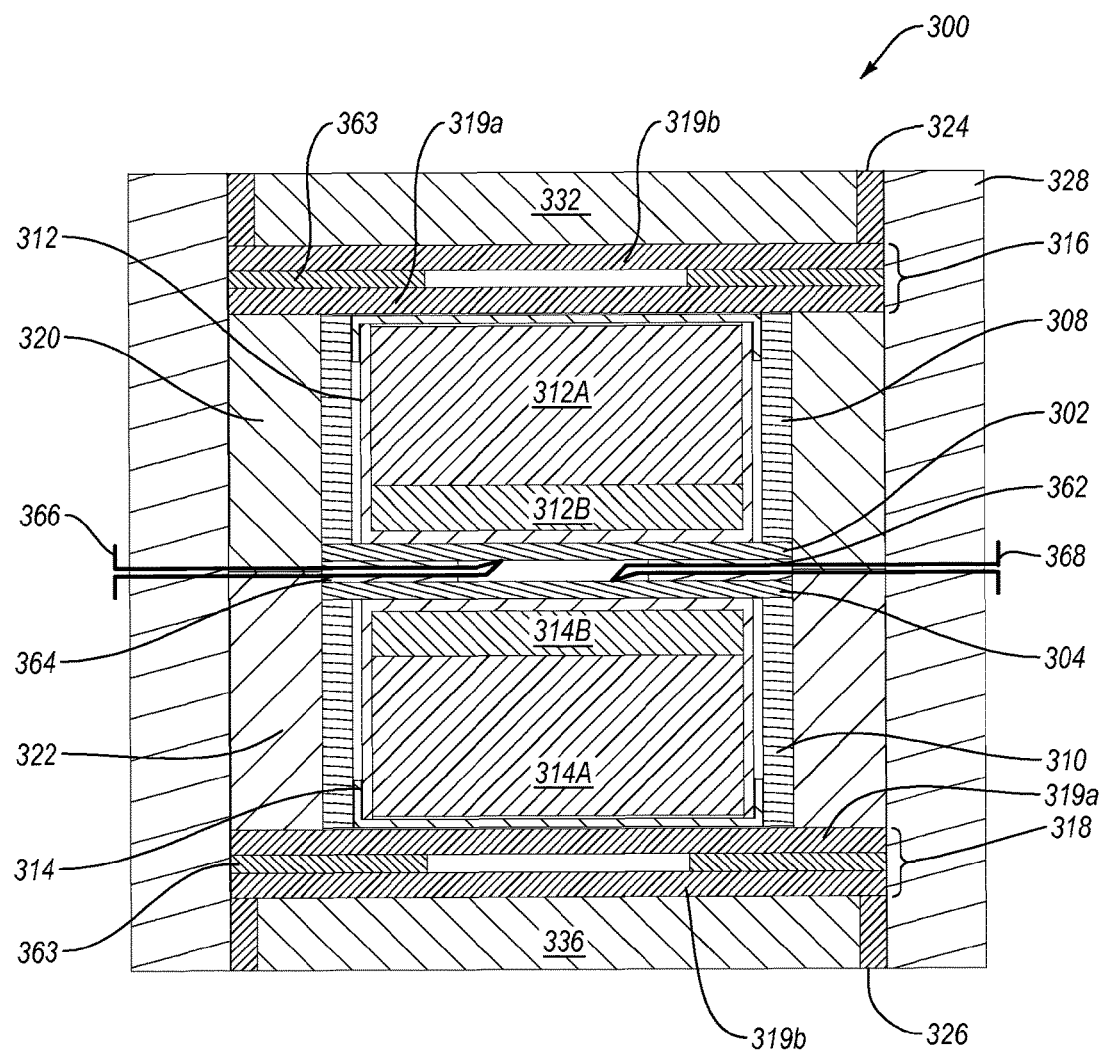
FIG. 3C is a cross-sectional view of the cell assembly shown in FIG. 3A according to another embodiment.

The cell assembly 300 may include one or more electrical contacts that electrically contact the can assemblies 312 and 314 at the corresponding proximal and distal end regions of the cell assembly. For example, in the illustrated embodiment, the cell assembly 300 may include a plurality of proximal disc-like electrical contacts 316 disposed generally adjacent to a proximal end of the first can assembly 312 and electrically contacting a periphery of the can assembly 312. A plurality of distal disc-like electrical contacts 318 may be disposed generally adjacent to a distal end of the second can assembly 314 and may electrically contact a periphery of the second can assembly 314. The electrical contacts 316, 318 may be made from titanium, a titanium alloy, or other suitable electrically conductive and temperature resistant material. In other embodiments, the proximal and distal disc-like electrical contacts 316, 318 may be replaced with an electrical contact that is configured as an annular member (i.e., washer), a rectangle, or the like. Moreover, the proximal and distal electrical contacts 316, 318 may include one, three, five, or any suitable number of electrical contacts. In yet another embodiment, as shown in FIG. 3C, the proximal disc-like electrical contact 316 and/or the distal disc-like electrical contact 318 may be replaced with an electrical contact that is configured as a first disc-like electrical contact 319A, a second disc-like electrical contact 319B, and an insulator ring 363 interposed between the first and second disc-like electrical contacts 319A, 319B. Such a configuration may allow for electrical current to pass between the first and second disc-like electrical contacts 319A, 319B through the central opening of the insulator ring 363. The first and second electrical contacts 319A, 319B may be made from titanium, a titanium alloy, or other suitable electrically conductive and temperature resistant material. Insulator ring 363 may comprise mica and/or any other suitable material.

Referring again to FIGS. 3A and 3B, a first substantially tubular pressure transmitting medium 320, such as a tube made from salt, may receive and extend about the first liner 308, and can assembly 312. A second substantially tubular pressure transmitting medium 322 may receive and extend about the second liner 310 and can assembly 314. In an embodiment, the first and second liners 308, 310 and the first and second substantially tubular pressure transmitting mediums 320, 322 may be formed of the same materials. In other embodiments, the first and second liners 308, 310 and the first and second substantially tubular pressure transmitting mediums 320, 322 may include one or more different materials exhibiting different pressure transmitting properties. Accordingly, the placement and/or type of materials in the first and second liners 308, 310 and the first and second substantially tubular pressure transmitting mediums 320, 322 may be customizable to help control the pressure transmitting characteristics of the cell assembly 100. The temperature measuring devices 366, 368 may be positioned between a distal end of the first substantially tubular pressure transmitting medium 320 and a proximal end of the second substantially tubular pressure transmitting medium 322. The proximal electrical contacts 316 may be proximally disposed adjacent to the proximal end of the first substantially tubular pressure transmitting medium 320 and the distal electrical contacts 318 may be distally disposed adjacent to the distal end of the second substantially tubular pressure transmitting medium 322.

A proximal anvil electrical contact 324 may be proximally disposed adjacent to the proximal electrical contacts 316 and may electrically contact the proximal electrical contacts 316. A distal anvil electrical contact 326 may be distally disposed adjacent to the distal electrical contacts 318 and may electrically contact the distal electrical contacts 318. The proximal and distal anvil electrical contacts 324, 326 may be made from steel, titanium, or any other suitable electrically conductive material. In an embodiment, as anvils of an ultra-high pressure press apply a selected pressure to respective faces of the cell assembly 300, one or more of the insulators 362, 364 may flex such that the distal end portion of the can assembly 312 and the proximal end portion of the can assembly 314 electrically contact one another.

The cell assembly 300 may further include a gasket medium 328 generally in the shape of a cube. The gasket medium 328 may define a receiving space 330 (FIG. 3B) therethrough that receives the heating elements 302, 304, first and second substantially tubular pressure transmitting liners 308, 310, insulators 362, 364, can assemblies 312, 314, proximal and distal electrical contacts 316, 318, and temperature measuring devices 366, 368. The receiving space 330 may also at least partially receive the proximal and distal anvil electrical contacts 324, 326. An end plug 332 may be disposed in an opening 334 defined by the proximal anvil electrical contact 324 and an end plug 336 may be disposed in an opening 338 (FIG. 3B) defined by the distal anvil electrical contact 326. Similar to plugs 132, 136, the end plugs 332 and 336 may comprise any suitable gasket material or any other suitable material.

Figure 4A:
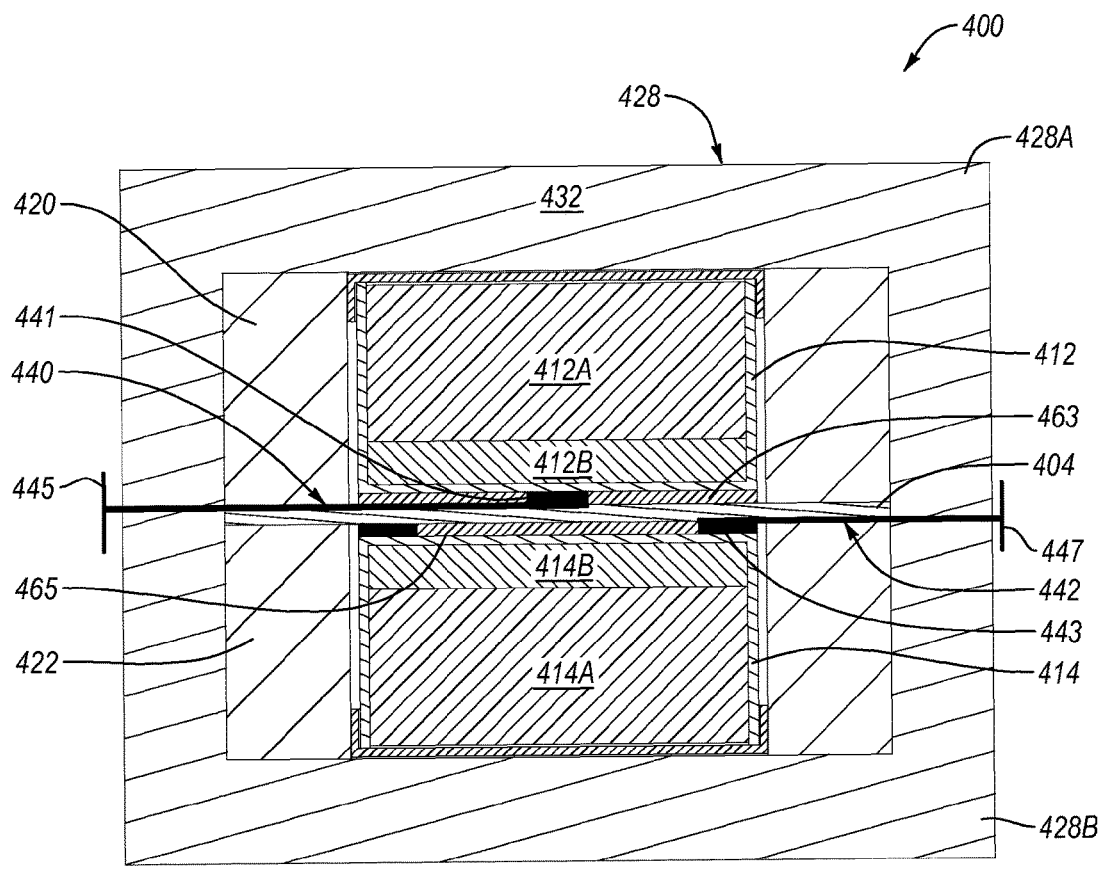
FIG. 4A is a cross-sectional view of an embodiment of a cell assembly enclosing two can assemblies each of which holds a plurality of diamond particles adjacent to a substrate.
Figure 4B:
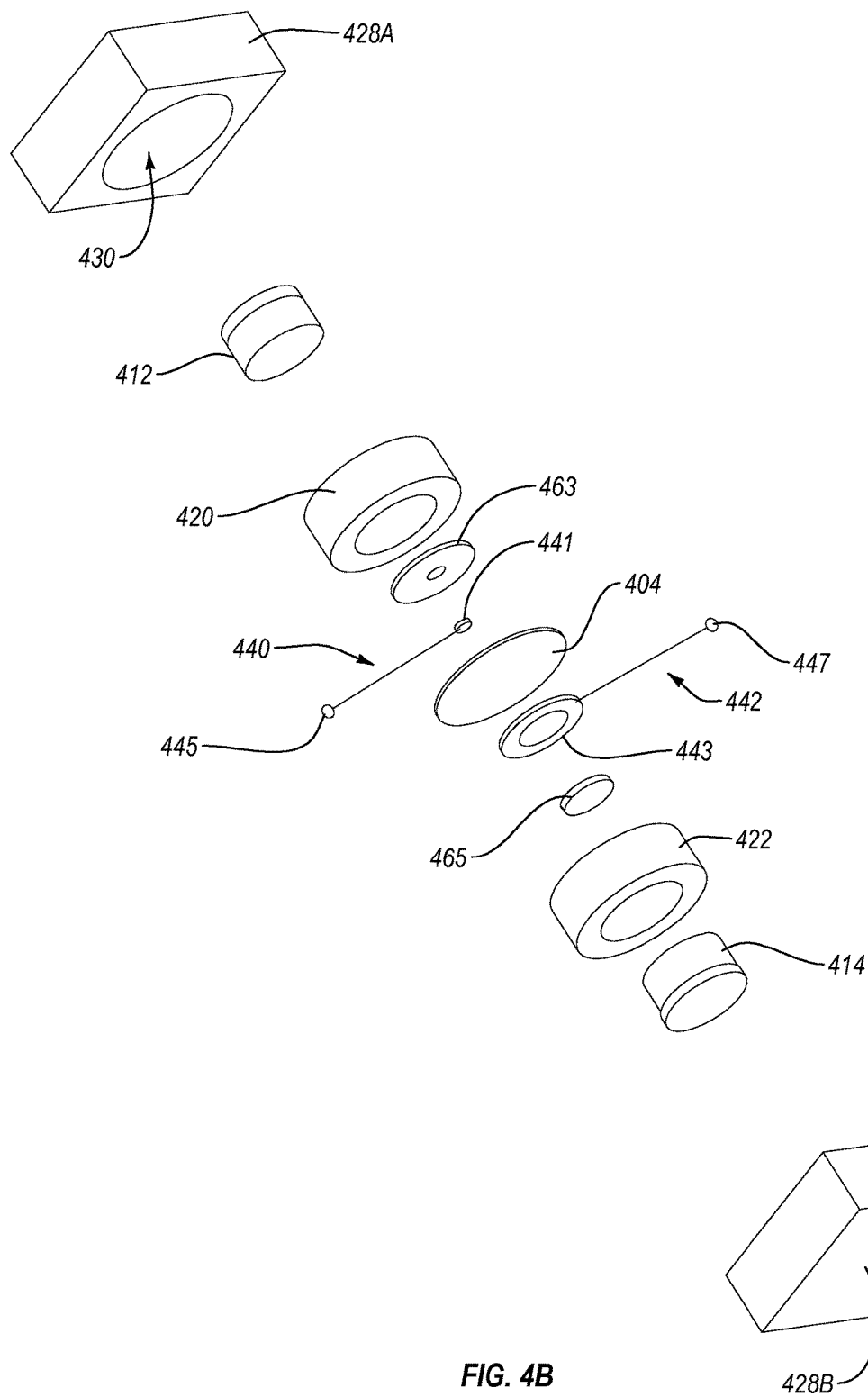
FIG. 4B is an exploded view of the cell assembly shown in FIG. 4A.

FIGS. 4A and 4B are cross-sectional and exploded isometric views, respectively, of another embodiment of a cell assembly 400. The cell assembly 400 has many of the same components and features that are included in the cell assemblies 100, 300 of FIGS. 1A-3B. Therefore, in the interest of brevity, the components and features of the cell assembly 100, 300, and 400 that correspond to each other have been provided with identical reference numbers, and an explanation thereof will not be repeated. However, it should be noted that the principles of the cell assembly 400 may be employed with any of the embodiments described in relation to FIGS. 1A-3B and vice versa.

The cell assembly 400 may include one or more resistance heating elements such as heating element 404. Like the heating elements of cell assemblies 100 and 300, the heating element 404 may comprise graphite or other suitable material. A pressure transmitting medium (e.g., comprising salt, salt and graphite, etc.) such as a first and second substantially tubular pressure transmitting medium 420 and 422 may be disposed distal and proximal the heating element 404.

In an embodiment, the heating element 404 may divide the cell assembly 400 into two chambers that receive can assemblies 412 and 414. The can assemblies 412, 414 may be configured similar to can assemblies 112, 114. For example, each can assembly 412 and 414 may include a corresponding substrate 412A and 414A (e.g., cobalt-cemented tungsten carbide substrate) and a corresponding volume of diamond particles 412B and 414B. As shown, heating element 404 may be positioned in proximity to the volume of diamond particles 412B of can assembly 412 and the volume of diamond particles 414B of the can assembly 412. A proximal surface of heating element 404 may be generally opposing a distal end surface of the can assembly 412. In an embodiment, the proximal surface of the heating element 404 may be generally parallel the distal end surface of the can assembly 412. Similarly, a distal surface of heating element 404 may be generally opposing a proximal end surface of can assembly 414. In an embodiment, the distal surface of the heating element 404 may be generally parallel the proximal end surface of can assembly 414.

Insulators may be disposed between heating element 404 and can assemblies 412, 414. For example, an insulator disc 465 may be disposed between a proximal end surface of can assembly 414 and the heating element 404. An insulator ring 463 may be disposed between a distal end surface of can assembly 412 and the heating element 404. Insulators 463, 465 may comprise mica and/or any other suitable material.

As shown in FIG. 4A, the diamond particles 412B, 414B within the respective can assemblies 412, 414 may be positioned toward and near the heating element 404 or the heating element 104 may be positioned between the diamond particles 412B and the diamond particles 414B. Accordingly, the heating element 404 may be configured to heat the diamond particles 412B and/or the diamond particles 414B before heating the substrate 412A and/or the substrate 414A. For example, in an embodiment, at least a portion of heat generated by the heating element 404 may first pass through the diamond particles 412B or diamond particles 414B before reaching the distal end region of the substrate 412A or the proximal end region of the substrate 414A. Such a configuration may help create a desired thermal gradient near the heating element 404 and the diamond particles 412B, 414B, thus requiring less time and/or energy to sinter the diamond particles 412B, 414B. Moreover, such a configuration may allow the heating element 404 to heat both the diamond particles 412B and the diamond particles 114B at substantially the same time, simultaneously, or nearly simultaneously.

In an embodiment, the electrical current pathway may bypass the can assemblies 412, 414 and pass directly through the heating element 404. For example, the cell assembly 400 may include side electrical contacts 440, 442 that electrically contact the heating element 404. In an embodiment, the first side electrical contact 440 may extend generally perpendicular to a longitudinal axis of the cell assembly 400 and may electrically contact a proximal portion of the heating element 404 and may include a disc-like portion 441 that is positioned within the central opening of the insulator ring 463. The second side electrical contact 442 may be generally opposite the first side electrical contact 440. The second side electrical contact 442 may electrically contact a distal portion of the heating element 404 and may include a ring-like portion 443. In an embodiment, the insulator 465 may be positioned within a central opening of the ring-like portion 443 of the second side electrical contact 442. The first and second side electrical contacts 440, 442 may each comprise a suitable electrically conductive and temperature-resistant material. For example, side-electrical contacts 440 and 442 may comprise steel, titanium, molybdenum, TZM molybdenum metal alloys, combinations thereof, or any other suitable electrically conductive material.

In the illustrated embodiment, the disc-like portion 441 of the first side electrical contact 440 may include an outer diameter which is less than an inner diameter of the ring-like portion 443 of the second side electrical contact 442. The disc-like portion 441 of the first side electrical contact 440 may be positioned over the central opening of the ring-like portion 443 of the second side electrical contact 442. As described above in relation to FIGS. 1E and 1F, by changing the size of disc-like portion 441 and/or ring-like portion 443, position of disc-like portion 441 and/or ring-like portion 443, and/or direction of current flow between the disc-like portion 441 of the first side electrical contact 440 and the ring-like portion 443 of the second side electrical contact 442 relative to the heating element 104, the direction and/or location of current flow through the heating element 404 may be varied and/or controlled. Consequently, the size, intensity, and heating pattern of the heating element 404 may also be localized, varied, and/or controlled to influence the heating characteristics of the diamond particles 412B, 414B.

In an embodiment, the first and second side electrical contacts 440, 442 may be positioned between a distal end of the first substantially tubular pressure transmitting medium 420 and a proximal end of the second substantially tubular pressure transmitting medium 422. In an embodiment, at least one of the first and second substantially tubular pressure transmitting mediums 420, 422 may include one or more recesses configured to receive the first and second side electrical contacts 440, 442. In addition, the first and second side electrical contacts 440, 442 may extend between the heating element 404 and side portions of the gasket medium 428. In an embodiment, a first side anvil electrical contact 445 may electrically contact an end region of the first side electrical contact 440 associated with one of the side portions of the gasket medium 428. Similarly, a second side anvil electrical contact 447 may electrically contact an end region of the second side electrical contact 442 associated with another side portion of the gasket medium 428.

The cell assembly 400 may further include the gasket medium 428 in the shape of a cube. As shown, the gasket medium 428 may comprise a two-part gasket medium including a first portion 428A and a second portion 428B.

The first and second portions 428A, 428B may each include an end wall, a side wall connected to the end wall, and an interior space 430 (FIG. 4B) at least partially defined by the end wall and the side wall with an edge of the side wall defining an opening into the interior space. Each portion 428A, 428B may further include a length defined between the opening and the end wall. In an embodiment, the first and second portions 428A, 428B may be substantially similar. In other embodiments, the first and second portions 428A, 428B may exhibit different configurations. For example, in an embodiment, the length of the first portion 428A may greater or less than the length of the second portion 428B. In another embodiment, the interior space of one of the first and second portions 428A, 428B may be larger or small than the other.

The interior spaces 430 of the first and second portions 428A, 428B may collectively define a receiving space that receives the heating element 404, insulators 463 and 465, and the first and second substantially tubular pressure transmitting medium 420, 422. The receiving space 430 may also at least partially receive the first and second side electrical contacts 440, 442. In an embodiment, at least one of the first or second portions 428A, 428B of the gasket medium 428 may include one or more recesses configured to receive the first and second side electrical contacts 440, 442.

While side electrical contacts 440, 442 are shown exhibiting wire-like configurations including disc-like and ring-like portions, in other embodiments, the side electrical contacts 440, 442 may exhibit different configurations. For example, one or more of the side electrical contacts 440, 442 may exhibit a disc-like, annular, rectangular configuration, or other suitable configuration. In other embodiments, one or more of the side electrical contacts 440, 442 may exhibit a wire-like or a thin-strip configuration including a square end member or the end member may be omitted. Further, while two side electrical contacts are illustrated, it will be appreciated that the cell assembly 400 may include any suitable number of side electrical contacts in addition to or in alternative to the proximal and distal end electrical contacts.

Figure 5A:
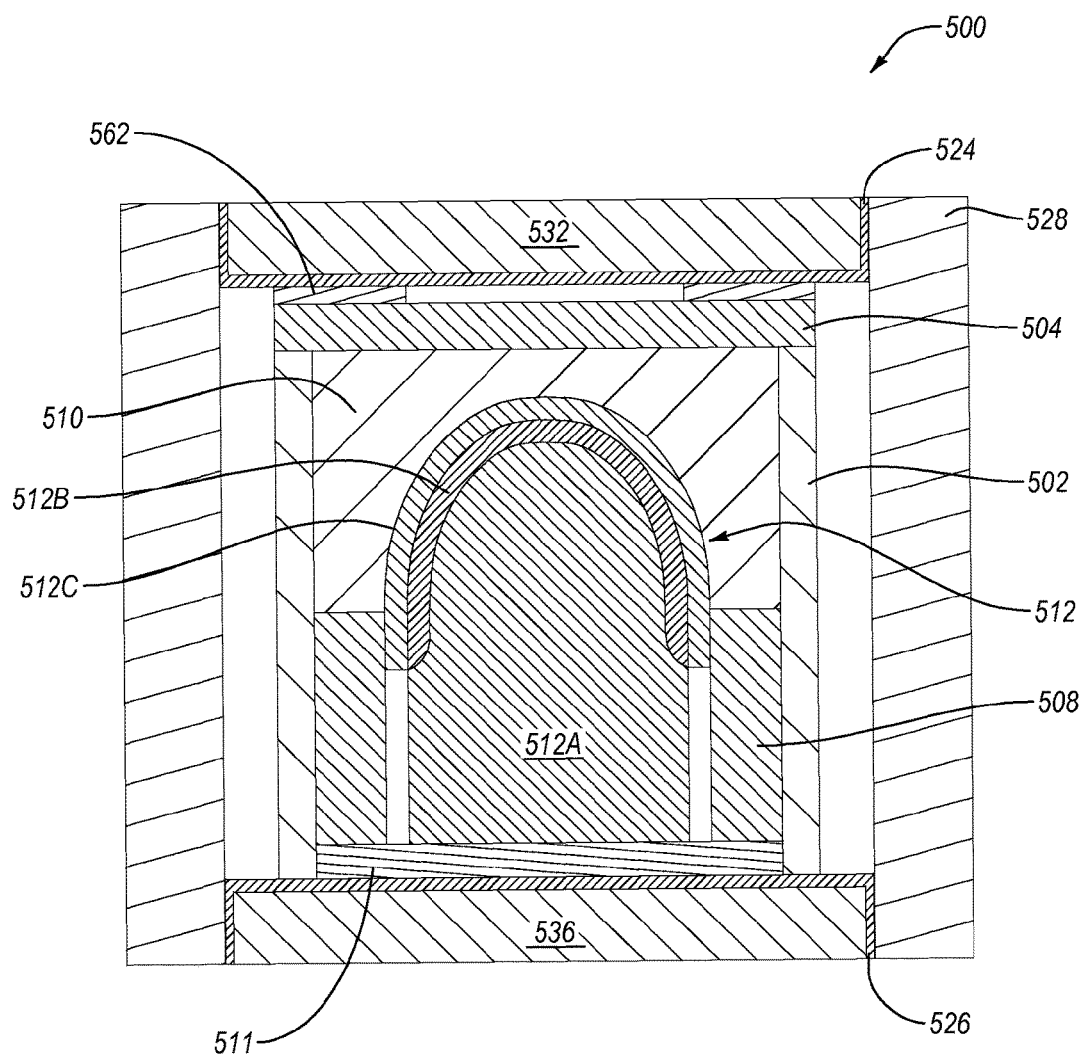
FIG. 5A is a cross-sectional view of an embodiment of a cell assembly enclosing a can assembly which holds a plurality of diamond particles adjacent to a substrate.
Figure 5B:
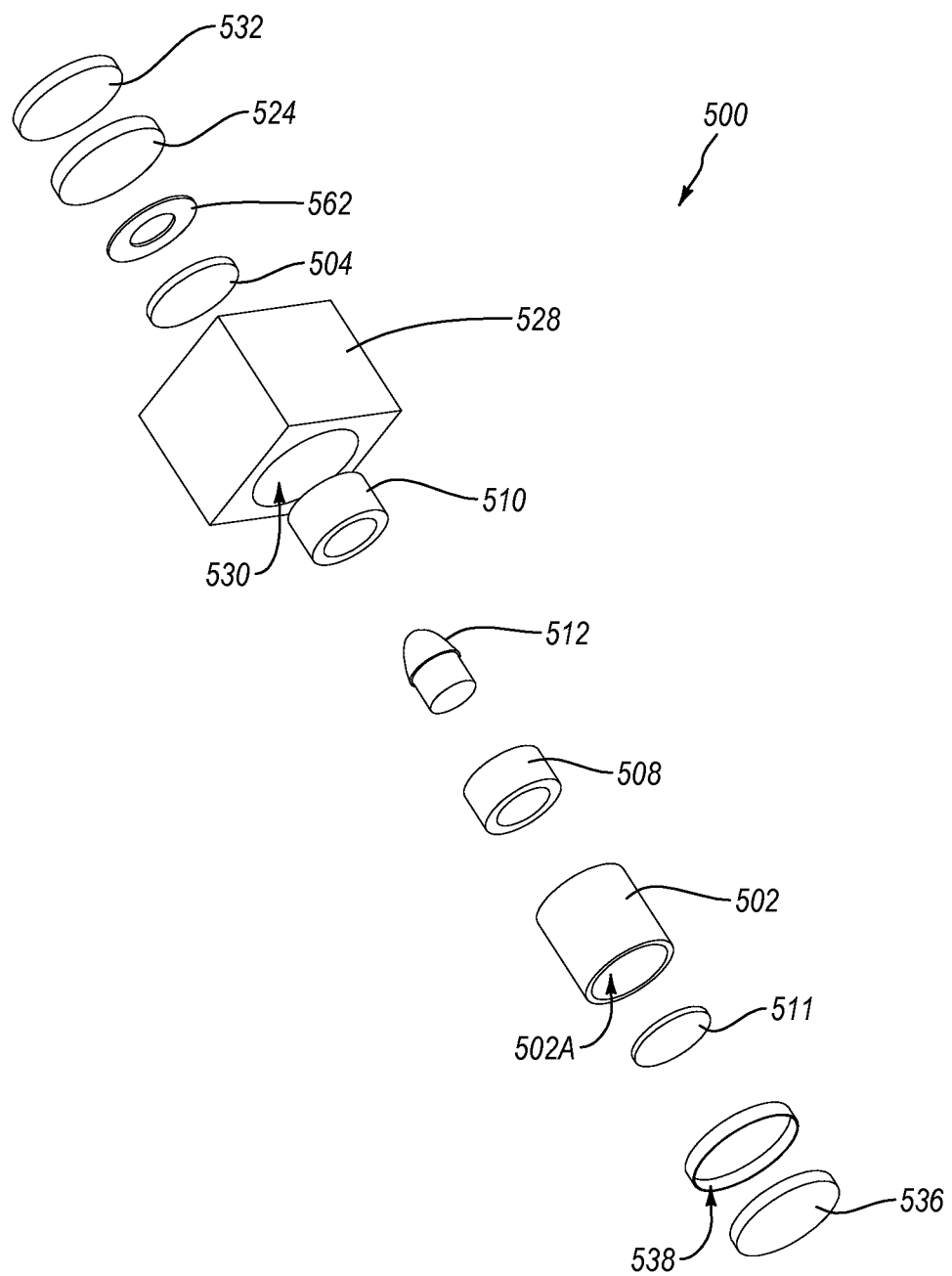
FIG. 5B is an exploded view of the cell assembly shown in FIG. 5A.

In other embodiments, cell assemblies may be configured for asymmetric heating or to apply more or less heat in a selected location or may be configured to generate heat proximate to a nonplanar superabrasive powder layer or diamond volume. For example, FIGS. 5A and 5B are cross-sectional and exploded isometric views, respectively, of an embodiment of a cell assembly 500. The cell assembly 500 has many of the same components and features that are included in the cell assemblies 100, 300, and 400 of FIGS. 1A-4B. Therefore, in the interest of brevity, the components and features of the cell assembly 100, 300, 400, and 500 that correspond to each other or are otherwise similar have been provided with identical reference numbers, and an explanation thereof will not be repeated. However, it should be noted that the principles of the cell assembly 500 may be employed with any of the embodiments described in relation to FIGS. 1A-4B and vice versa.

The cell assembly 500 may include a first substantially tubular resistance heating element 502 defining a passageway 502A (FIG. 5B) and a second disc-like resistance heating element 504. The heating element 502 may include a proximal end region having a proximal mouth and a distal end region having a distal mouth, with the passageway 502A extending between the proximal mouth and the distal mouth. A pressure transmitting medium, such as a first tubular liner 508, a cap 510, and a disc 511 may be disposed in the passageway 502A of the heating element 502. The cap 510 may be positioned proximal the first tubular liner 508 and the disc 511 may be positioned distal the first tubular liner 508. In an embodiment, the cap 510 may include a distal opening, a proximal base portion, and conical receiving space at least partially defined between the distal opening and the proximal base portion. The heating element 504 may be positioned toward the proximal closed end of the cap 510. Cap 510, disc 511, and liner 508 may comprise salt, salt and graphite, or another suitable material.

The first liner 508 and the cap 510 may receive a can assembly 512. The can assembly 512 may include a cup 512C defining a generally concave recess, a volume of diamond particles 512B positioned within the opening of the cup 512C, and a corresponding substrate 512A including a proximal end surface. The recess of the cup 512C and/or the proximal end surface of the substrate 512A may be shaped and/or configured to form the volume of diamond particles 512B in a variety of different shapes and/or configurations. For example, in the illustrated embodiment, the recess of the cup 512C and the proximal end surface of the substrate 512A may collectively be configured to form or shape the volume of diamond particles 512B into a generally dome-like shape. In other embodiments, the recess of the cup 512C and/or the proximal end surface of the substrate 512A may be shaped and/or configured to form or shape the volume of diamond particles 512B into a convex shape, a tooth-like shape, a triangular-like shape, a chisel-like shape, a plurality of protrusions, a plurality of nubs, combinations thereof, or any other suitable shape and/or configuration. The cup 512C may be positioned within the cap 510. As shown, the heating element 502 may generally surround the diamond particles 512B and the substrate 512A, while the heating element 504 may be positioned toward the diamond particles 512B of the can assembly 512. The heating element 504 may include a distal surface generally opposing a proximal end surface of the can assembly 512. In some embodiments, heating element 502 may radiate heat toward the center of the heating element 502 to heat both the diamond particles 512B and the substrate 512A, while heating element 504 may generate at least some heat near a tip portion of the diamond particles 512B within the cup 512C. Thus, the heating elements 502 and/or 504 may shift or influence the heating pattern within the diamond particles 512B. For example, such a configuration may allow heating of the tip portion of the diamond particles 512B without overheating the outer radial portion of the diamond particles 512B within the cup 512C.

A proximal anvil electrical contact 524 may be disposed adjacent to the heating element 504 and may electrically contact the heating element 504. A distal anvil electrical contact 526 may be disposed adjacent to the distal end region of the heating element 502 and may electrically contact the heating element 502. The proximal and distal anvil electrical contacts 524, 526 may comprise titanium, steel, zirconium, molybdenum, TZM molybdenum metal alloys, combinations thereof, or any other suitable electrically conductive material. For example, in an embodiment, at least one of the proximal anvil electrical contact 524 or the distal anvil electrical contact 526 may comprise a titanium and/or zirconium cup. Such a configuration may help reduce heat transfer out of the ends of the cell assembly 500 due to the lower thermal conductivity of titanium and/or zirconium compared to steel and/or help reduce the thickness of the anvil electrical contacts 524, 526. For example, in an embodiment, at least one of the proximal anvil electrical contact 524 or the distal anvil electrical contact 526 may exhibit a thickness of about 0.01 inches, about 0.02 inches, about 0.03 inches, about 0.04 inches, about 0.05 inches, about 0.06 inches, about 0.07 inches, about 0.08 inches or about 0.09 inches. In other embodiments, at least one of the proximal anvil electrical contact 524 or the distal anvil electrical contact 526 may exhibit a thickness between about 0.01 inches and about 0.1 inches; about 0.02 inches and 0.09 inches; about 0.03 inches and about 0.08 inches; about 0.04 inches and about 0.07; about 0.01 inches and about 0.05 inches; or about 0.02 inches and about 0.04 inches. In other embodiments, the thickness of at least one of the proximal anvil electrical contact 524 or the distal anvil electrical contact 526 may be larger or smaller.

In other embodiments, at least one of the proximal and/or distal anvil electrical contacts 524, 526 may exhibit a ring-like configuration or any other suitable configuration. In an embodiment, a proximal annular insulator 562 may be interposed between the proximal anvil electrical contact 524 and the heating element 504. The proximal insulator 562 may comprise any suitable insulative material, such as mica.

The cell assembly 500 may further include a gasket medium 528 generally in the shape of a cube. The gasket medium 528 may define a receiving space 530 (FIG. 5B) that receives the heating elements 502, 504, a first tubular liner 508, a cap 510, and a disc 511, and can assembly 512. The receiving space 530 may also at least partially receive the proximal and distal anvil electrical contacts 524 and 526. A plug 532 may be disposed in an opening (not shown) defined by the proximal anvil electrical contact 524 and a gasket medium plug 536 may be disposed in an opening 538 defined by the distal anvil electrical contact 526. The gasket medium 528 and the plugs 532 and 536 may comprise any suitable gasket material or any other suitable materials, without limitation.

Figure 6:
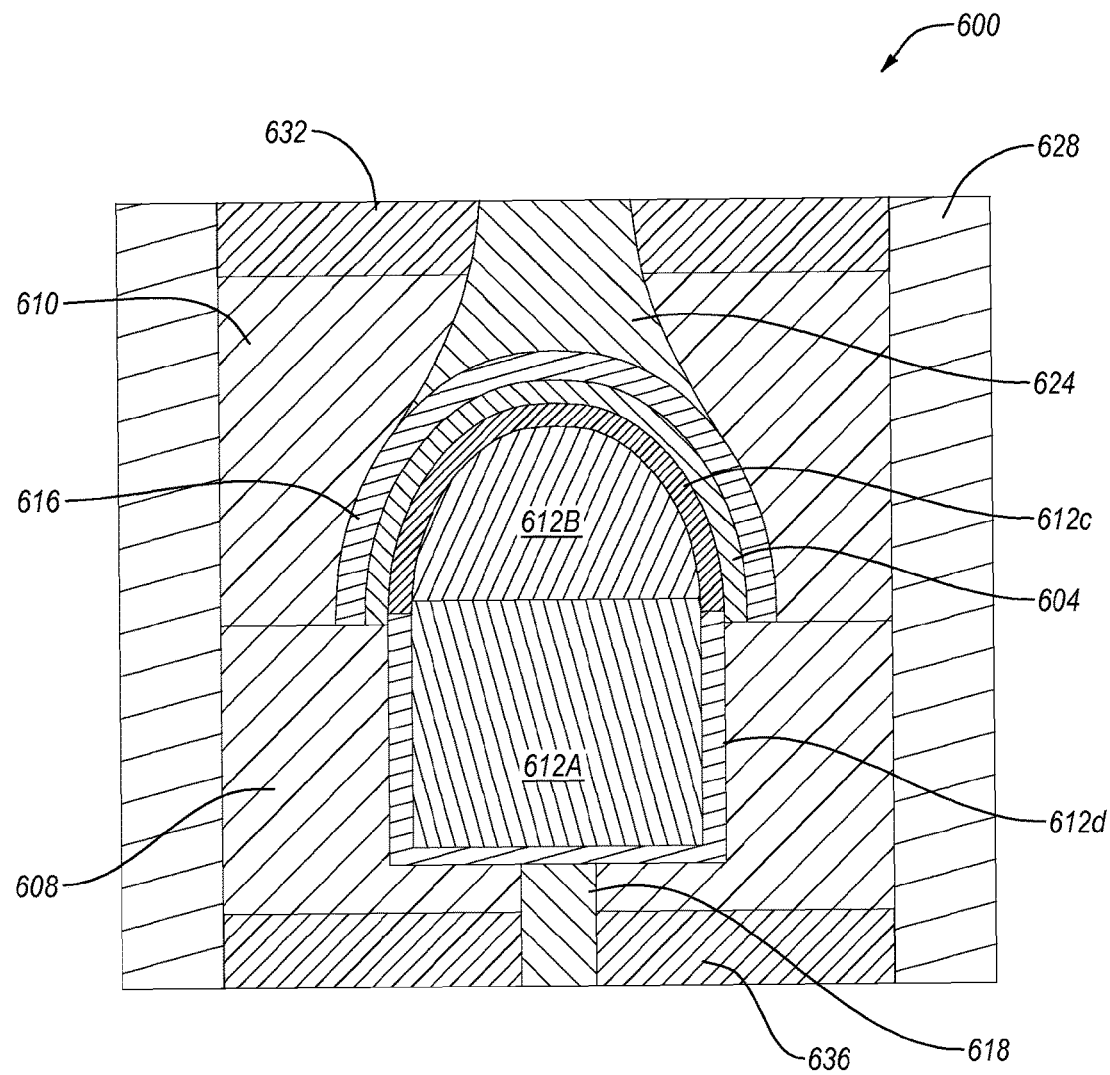
FIG. 6 is a cross-sectional view of another embodiment of a cell assembly enclosing a can assembly which holds a plurality of diamond particles adjacent to a substrate.

FIG. 6 is a cross-sectional view of a cell assembly 600 according to another embodiment. The cell assembly 600 has many of the same components and features that are included in the cell assemblies 100, 300, 400, and 500 of FIGS. 1A-5B. Therefore, in the interest of brevity, the components and features of the cell assembly 100, 200, 300, 400, 500, and 600 that correspond to each other or are otherwise similar have been provided with identical reference numbers, and an explanation thereof will not be repeated. However, it should be noted that the principles of the cell assembly 500 may be employed with any of the embodiments described in relation to FIGS. 1A-5B and vice versa.

The cell assembly 600 may include a pressure transmitting medium such as a cap 610 and cup liner 608 positioned distal to the cap 610. The cap 610 may include a distal opening, a proximal base portion, and a concaved receiving space at least partially defined between the distal opening and the proximal base portion. In an embodiment, the proximal base portion of the cap 610 may include an opening extending between the receiving space and a proximal surface. In the illustrated embodiment, the cup liner 608 may exhibit a generally can-like configuration. Cap 610 and/or cup liner 608 may comprise salt, salt and graphite, or another suitable material.

The cell assembly 600 may also include one or more resistance heating elements, such as heating element 604. Like the heating elements of cell assembly 100, the heating element 604 may comprise graphite or any other suitable material. As shown, the heating element 604 may be positioned within the receiving space of the cap 610.

The cup liner 608 and the cap 610 may receive a can assembly 612. The can assembly 612 may include a proximal cup 612C defining a generally concave or bowl-like recess, a volume of diamond particles 612B positioned within the recess of the cup 612C, and a corresponding substrate 612A positioned within a distal portion 612D configured as a generally cylindrical can. The recess of the cup 612C may be shaped and/or configured to form the volume of diamond particles 612B in a variety of different shapes and/or configurations. For example, in the illustrated embodiment, the recess of the cup 612C may be configured to form or shape the volume of diamond particles 612B into a generally dome-like shape. In other embodiments, the recess of the cup 612C may be shaped and/or configured to form or shape the volume of diamond particles 612B into another nonplanar suitable shape and/or configuration.

The heating element 604 may be positioned within the recess of the cap 610 and electrically contacting the cup 612C. In an embodiment, the heating element 604 may exhibit a generally bowl-like shape configured to generally conform to the peripheral shape of the cup 612C. While the heating element 604 is shown exhibit a generally bowl-like shape, the heating element 604 may exhibit a generally cylindrical shape, a generally cube shape, an asymmetrical shape, or any other suitable shape.

As shown, the heating element 604 may be positioned to generally cover the area of the cup 612C containing the volume of diamond particles 612B to be sintered. Thus, heat generated by the heating element 604 may heat the volume of diamond particles 612B in a generally uniform pattern. In addition, because of the position of the heating element 604, heat generated by the heating element 604 may be targeted at the volume of diamond particles 612B. Such a configuration may allow cobalt (or another suitable catalyst) from the substrate 612A to sweep from a region adjacent to the volume of diamond particles 612B into the interstitial regions between the diamond particles 612B during sintering in a more uniform fashion than another HPHT processes in which the entirety of a can assembly is heated.

The cell assembly 600 may include one or more electrical contacts to form at least a part of an electrical current through the cell assembly 600. For example, in the illustrated embodiment, the cell assembly 600 may include a proximal electrical contact 616 disposed generally adjacent to a proximal surface of the heating element 604 and electrically contacting a periphery of the heating element 604. In an embodiment, the proximal electrical contact 616 may exhibit a generally bowl-like shape configured to generally correspond to the shape of the heating element 604. As shown, a concave recess in the proximal electrical contact 616 may receive at least a portion of the heating element 604. A distal generally cylindrical electrical contact 618 may be disposed generally adjacent to a distal end of the distal portion 612D of the can assembly 612 and may electrically contact a periphery of the can assembly 612D. The distal electrical contact 618 may extend through an opening formed in a distal portion of the can liner 608. While distal electrical contact 618 is illustrated configured as a generally cylindrical member, in other embodiment, the distal electrical contact 618 may be configured as a button-like member, a wire-like member, a tubular member, combinations thereof, or any other suitable type of electrical contact. The electrical contacts 616, 618 may be made from titanium, a titanium alloy, or other suitable electrically conductive and temperature-resistant material. Moreover, the proximal and distal electrical contacts 616, 618 may include one, three, five, or any other suitable number of electrical contacts.

A proximal anvil electrical contact 624 may be proximally disposed adjacent to the proximal electrical contact 616 and may electrically contact the proximal electrical contact 616. The proximal anvil electrical contact 624 may exhibit any suitable shape. For example, in the illustrated embodiment, the proximal anvil electrical contact 624 may exhibit a generally tapered shape having a distal concaved recess configured to generally to conform to the shape of the proximal electrical contact 616. The proximal anvil electrical contact 624 may be made from steel, titanium, or any other suitable electrically conductive material. In other embodiments, cell assembly 600 may include a distal anvil electrical contact distally disposed adjacent to the distal electrical contact 618 that electrically contacts the distal electrical contact 618.

The cell assembly 600 may further include a gasket medium 628 generally in the shape of a cube. The gasket medium 628 may define a receiving space that receives at least the heating element 604, the can assembly 612, the proximal electrical contact 616, and pressure transmitting mediums 608, 610. The receiving space may also at least partially receive the proximal anvil electrical contact 624 and the distal electrical contact 618. A plug 632 may be positioned at the proximal end of the gasket medium 628. At least a portion of the proximal anvil electrical contact 624 may extend through a formed in the plug 632. A plug 636 may be positioned at the distal end of the gasket medium 628. As shown, at least a portion of the distal electrical contact may extend through a hole formed in the plug 636. The gasket medium 628 and the plugs 632 and 636 may comprise any suitable gasket material or any other suitable materials, without limitation.

In an embodiment, an electrical current may pass from an anvil (shown in FIG. 2) to the proximal anvil contact 624. From the proximal anvil contact 624, the electrical current may pass to the proximal electrical contact 616 and then to the heating element 604. As discussed above, the heating element 604 may convert electrical energy into heat to heat the contents of the can assembly 612. From the heating element 604, the electrical current may then pass to the can assembly 612. From the can assembly 612, the electrical current may pass through the distal electrical contact 618 and out the cell assembly 600. In other embodiments, the proximal anvil contact 624 may be omitted and electrical current may pass directly from the anvil to the proximal electrical contact 616.

Thus, the cell assembly 600 may be configured to provide heating or generally generate heat near the volume of diamond particles 612B within the can assembly 612. Such a configuration may allow higher sintering temperatures because the heating element 604 can provide heating to the volume of diamond particles 612B without overheating other portions of the can assembly 612.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A cell assembly for use in a high-pressure cubic press, comprising:
    a first can assembly that holds a first diamond volume, the first can assembly including a first end surface in proximity to the first diamond volume, the first can assembly including refractory metal that is in direct contact with the first diamond volume;
    a second can assembly that holds a second diamond volume, the second can assembly including second end surface in proximity to the second diamond volume, the second can assembly including refractory metal that is in direct contact with the second diamond volume;
    at least one heating element positioned between the first can assembly and the second can assembly, the at least one heating element including a length and a thickness, wherein the length is greater than the thickness, the at least one heating element including a major surface generally opposing and positioned adjacent to the first end surface of the first can assembly and adjacent to the second end surface of the second can assembly, the at least one heating element positioned and configured to heat the first diamond volume and the second diamond volume;
    at least one pressure transmitting medium including salt and extending about the first can assembly and the second can assembly, wherein a cross-section of the cell assembly includes the first can assembly and the second can assembly being positioned laterally nearest to the at least one pressure transmitting medium; and
    a gasket medium defining a receiving space that receives the first can assembly, the second can assembly, the at least one heating element, and the at least one pressure transmitting medium therein, wherein a cross-section of the cell assembly includes the at least one pressure transmitting medium being positioned laterally nearest to the gasket medium.

2. The cell assembly of claim 1, wherein the at least one heating element comprises a disc, a washer, or an annular ring having a center generally aligned with a center of the diamond volume.

3. The cell assembly of claim 1, wherein the major surface of the at least one heating element is generally parallel to a top or bottom surface of a first substrate that is positioned adjacent to the first diamond volume.

4. The cell assembly of claim 3, wherein the major surface of the at least one heating element is adjacent to the diamond volume.

5. The cell assembly of claim 1, wherein the at least one heating element comprises a graphite disc, a washer, or an annular ring.

6. The cell assembly of claim 5, wherein the first diamond volume includes a first plurality of diamond particles positioned adjacent to a first substrate and the second diamond volume includes a second plurality of diamond particles positioned adjacent to a second substrate, and wherein the graphite disc, the washer, or the annular ring is positioned between the first can assembly and the second can assembly.

7. The cell assembly of claim 6, further comprising:
    a proximal electrical contact electrically contacting the first can assembly at a proximal region thereof; and
    a distal electrical contact electrically contacting the second can assembly at a distal region thereof.

8. The cell assembly of claim 6, further comprising:
    a first side electrical contact electrically contacting a proximal surface of the graphite disc, the washer, or the annular ring; and
    a second side electrical contact electrically contacting a distal surface of the graphite disc, the washer, or the annular ring.

9. The cell assembly of claim 1, further comprising:
    a thermocouple near the at least one heating element, the thermocouple configured to measure a temperature of the at least one heating element.

10. The cell assembly of claim 1, further comprising:
a first heating element including a distal surface adjacent to first end surface of the first can assembly; and
a second heating element including a proximal surface adjacent to the second end surface of the second can assembly.

11. The cell assembly of claim 1, wherein the at least one of the first can assembly or the second can assembly comprises an open top cup including a receiving space that holds the first or second diamond volume and at least a portion of a substrate.

12. The cell assembly of claim 1, wherein the at least one pressure transmitting medium comprises a substantially tubular liner including salt.

13. The cell assembly of claim 1, wherein the gasket medium comprises at least one gasket material selected from a group consisting of a naturally occurring gasket material and a synthetic gasket material.

14. The cell assembly of claim 1, wherein the first or second diamond volume comprises diamond particles or a preformed polycrystalline diamond volume.

15. A cell assembly for use in a high-pressure cubic press, comprising:
a first can assembly that holds a first diamond volume positioned adjacent to a first substrate, the first can assembly including a distal end and a proximal end, the first can assembly including refractory metal that is in direct contact with the first diamond volume;
a second can assembly that holds a second diamond volume positioned adjacent to a second substrate, the first can assembly including a distal end and a proximal end, the second can assembly including refractory metal that is in direct contact with the second diamond volume;
a heating element positioned between the first diamond volume and the second diamond volume, in a manner that a distal end of the heating element is positioned adjacent to the proximal end of the first can assembly, and a proximal end of the heating element is positioned adjacent to the distal end of the second can assembly, the heating element positioned and configured to heat at least one of the first diamond volume or the second diamond volume;
a pressure transmitting medium including salt and extending about at least one of the first can assembly or the second can assembly, wherein a cross-section of the cell assembly includes the first can assembly and the second can assembly being positioned laterally nearest to the at least one pressure transmitting medium; and
a gasket medium defining a receiving space that receives the first can assembly, the second can assembly, the heating element, and the pressure transmitting medium therein, wherein a cross-section of the cell assembly includes the pressure transmitting medium being positioned laterally nearest to the gasket medium.

16. The cell assembly of claim 15, wherein the heating element is a first heating element, and further comprising:
a second heating element positioned between the first diamond volume and the second diamond volume, wherein the second heating element is configured to heat at least one of the first diamond volume or the second diamond volume.

17. The cell assembly of claim 16, further comprising:
an insulator positioned between the first heating element and the second heating element.

18. A method, comprising:
disposing at least one a first can assembly and a second can assembly within at least one pressure transmitting medium that extends about the at least one first can assembly and the second can assembly, the at least one each of the first can assembly and the second can assembly including an end surface and holding a diamond volume, the at least one each of the first can assembly and the second can assembly including refractory metal that is in direct contact with the diamond volume;
positioning a substantially planar heating element adjacent to the end surface of the at least one can assembly between the first can assembly and the second can assembly such that the heating element heats the diamond volumes of the respective first can assembly and second can assembly when a current is passed therethrough, the heating element including a length and a thickness, wherein the length is greater than the thickness; and
sealing the diamond volumes of the respective first can assembly and second can assembly in the at least one can assembly, the heating element, and the at least one pressure transmitting medium within a gasket medium to form a cell assembly, wherein a cross-section of the cell assembly includes the at least one can assembly being positioned laterally nearest to the at least one pressure transmitting medium, and the pressure transmitting medium being positioned laterally nearest to the gasket medium.

19. The method of claim 18, further comprising:
electrically contacting a first electrical contact to the heating element at a proximal surface thereof; and
electrically contacting a second electrical contact to the heating element at a distal surface thereof.

20. The cell assembly of claim 1, wherein the gasket medium continuously extends along opposing sides of the at least one can assembly.

* * * * *